(12) United States Patent
Ishido et al.

(10) Patent No.: US 10,605,969 B2  
(45) Date of Patent: Mar. 31, 2020

(54) OPTICAL FILTER AND DEVICE USING THE SAME

(71) Applicant: AGC Inc., Chiyoda-ku (JP)

(72) Inventors: So Ishido, Koriyama (JP); Atsushi Koyanagi, Koriyama (JP)

(73) Assignee: AGC Inc., Chiyoda-ku (JP)

( * ) Notice: Subject to any disclaimer, the term of this patent is extended or adjusted under 35 U.S.C. 154(b) by 197 days.

(21) Appl. No.: 15/620,218

(22) Filed: Jun. 12, 2017

(65) Prior Publication Data

US 2017/0276846 A1 Sep. 28, 2017

Related U.S. Application Data

(63) Continuation of application No. PCT/JP2015/085221, filed on Dec. 16, 2015.

(30) Foreign Application Priority Data

Dec. 19, 2014 (JP) .................................. 2014-257822  
Jun. 30, 2015 (JP) .................................. 2015-131594

(51) Int. Cl.  
*G02B 1/14* (2015.01)  
*G02B 5/20* (2006.01)  
(Continued)

(52) U.S. Cl.  
CPC ............ *G02B 5/281* (2013.01); *C09B 57/007* (2013.01); *C09B 67/009* (2013.01);  
(Continued)

(58) Field of Classification Search  
CPC . G02B 1/04; G02B 1/14; G02B 5/208; G02B 5/281; G02B 5/282; G03F 7/0007;  
(Continued)

(56) References Cited

U.S. PATENT DOCUMENTS 5,380,842 A * 1/1995 Itoh ...................... C07D 209/44  
540/128  
2012/0145901 A1 6/2012 Kakiuchi et al.  
(Continued)

FOREIGN PATENT DOCUMENTS

CA 2 838 581 A1 12/2012  
CN 103282443 A 9/2013  
(Continued)

OTHER PUBLICATIONS

International Search Report dated Feb. 2, 2016 in PCT/JP2015/085221 filed Dec. 16, 2015 ( With English Translation).  
(Continued)

*Primary Examiner* — Bijan Ahvazi  
(74) *Attorney, Agent, or Firm* — Oblon, McClelland, Maier & Neustadt, L.L.P.

(57) ABSTRACT

An optical filter is provided with a structure that contains a green coloring matter and a black coloring matter and satisfies the following requirements (i) and (ii). Further a device is provided with such an optical filter. (i) An average transmittance of light in the wavelength range of 400 to 730 nm is 2% or less. (ii) A continuous 50 nm wavelength range where an average transmittance is 80% or more exists in the wavelength range of 800 to 1000 nm.

14 Claims, 9 Drawing Sheets

(51) Int. Cl.
*G02B 5/28* (2006.01)
*C09B 57/00* (2006.01)
*H04N 5/33* (2006.01)
*G01J 1/04* (2006.01)
*G02B 5/22* (2006.01)
*C09B 67/44* (2006.01)
*C09B 67/46* (2006.01)
*C09B 67/22* (2006.01)

(52) U.S. Cl.
CPC ...... *C09B 67/0033* (2013.01); *C09B 67/0083* (2013.01); *G01J 1/0488* (2013.01); *G02B 1/14* (2015.01); *G02B 5/208* (2013.01); *G02B 5/223* (2013.01); *H04N 5/33* (2013.01)

(58) Field of Classification Search
CPC ..... G01J 1/0488; G01J 5/0803; C09B 33/147; C09B 35/03; C09B 35/033; C09B 35/037; C09B 57/007; H01L 27/14621; H04N 5/33
See application file for complete search history.

(56) References Cited

U.S. PATENT DOCUMENTS

2014/0091419 A1* 4/2014 Hasegawa ............ G02B 13/004
257/432

2014/0145126 A1 5/2014 Suemitsu et al.
2015/0260885 A1 9/2015 Takishita et al.
2015/0293282 A1* 10/2015 Takishita ............... G02B 5/208
359/359

FOREIGN PATENT DOCUMENTS

| | | |
|---|---|---|
| CN | 103608705 A | 2/2014 |
| CN | 104937452 A | 9/2015 |
| EP | 2 940 495 A1 | 11/2015 |
| JP | 5447101 | 3/2014 |
| JP | 2014-130173 | 7/2014 |
| JP | 2014-130332 | 7/2014 |
| KR | 10-2013-0108650 | 10/2013 |
| KR | 10-2014-0041528 | 4/2014 |
| KR | 10-2015-0064107 | 6/2015 |
| TW | 201241098 A1 | 10/2012 |
| TW | 201432323 A | 8/2014 |
| WO | WO 2012/091083 A1 | 7/2012 |
| WO | WO-2012091083 A1 * | 7/2012 ............ C09B 35/03 |
| WO | WO 2012/169447 A1 | 12/2012 |
| WO | WO 2014/084147 A1 | 6/2014 |
| WO | WO 2014/103628 A1 | 7/2014 |

OTHER PUBLICATIONS

Written Opinion dated Feb. 2, 2016 in PCT/JP2015/085221 filed Dec. 16, 2015.

* cited by examiner

OPTICAL FILTER AND DEVICE USING THE SAME

CROSS-REFERENCE TO RELATED APPLICATIONS

The present application is a continuation of prior International Application No. PCT/JP2015/085221 filed on Dec. 16, 2015 which is based upon and claims the benefit of priority from Japanese Patent Applications Nos. 2014-257822 filed on Dec. 19, 2014, and 2015-131594 filed on Jun. 30, 2015; the entire contents of all of which are incorporated herein by reference.

FIELD

The present invention relates to an optical filter that selectively transmits light in an infrared wavelength range, and a device using the same such as an infrared camera or an infrared sensor.

BACKGROUND

In recent years, in an imaging device using a solid-state image sensor such as a CCD or a CMOS image sensor, a filter that shields light in a near-infrared wavelength range, a near infrared cut filter, has been used for the purpose of well reproducing a color tone and obtaining a clear image.

On the other hand, unlike the near-infrared cut filter, a filter that shields light in a visible wavelength range (to be also referred to as visible light hereinafter) and transmits light in an infrared wavelength range (to be also referred to as infrared light hereinafter) to increase sensitivity of the infrared light, an infrared transmission filter, has also been used mainly for an infrared camera, an infrared sensor, and the like, and demands for the infrared transmission filter excellent in infrared transmitting property/visible light shielding property, and an infrared camera, an infrared sensor, and the like using this have also been increasing.

As the infrared transmission filter, for example, in the patent document WO 2014/084147 A1 discloses a filter using four pigments (red/yellow/blue/purple pigments) and having an average transmittance of light in the wavelength range of 825 to 1300 nm being 99% or more. On the other hand, its average transmittance of light in the wavelength range of 400 to 700 nm is about 6% and thus is not low at all.

The patent document JP-A 2014-130332 discloses an infrared transmission typed optical filter using a perylene-based compound and two types of colorants (a blue or green colorant and a yellow or red colorant) in combination, and an optical sensor using it.

However, even this optical filter has a transmittance of light in the wavelength range of 700 nm being about 4 to 7%, and thus the shielding property against visible light is insufficient, resulting in that it is impossible to obtain a highly sensitive optical sensor.

As above, in the conventional infrared transmission filter, particularly, the shielding property of visible light is not sufficient, and further in a spectral transmittance curve, a gradient (rising) of change in transmittance from the visible wavelength range to the infrared wavelength range is gentle. Therefore, the light in an unnecessary wavelength range cannot be suppressed sufficiently, to thus be noise, so that it is not possible to achieve an infrared camera and an infrared sensor that have high sensitivity.

SUMMARY

It is an object of the present invention is to provide an optical filter having an excellent infrared selective transmitting property that is excellent in visible light shielding property and infrared transmitting property and in which a transmittance changes steeply in a wavelength range ranging from a visible wavelength range to an infrared wavelength range, and a highly sensitive device using such an optical filter.

An optical filter according to one aspect of the present invention includes a structure that contains a green coloring matter and a black coloring matter and satisfies the following requirements (i) and (ii):

(i) an average transmittance of light in the wavelength range of 400 to 730 nm is 2% or less, and (ii) a continuous 50 nm wavelength range where an average transmittance is 80% or more exists in the wavelength range of 800 to 1000 nm.

Further, a device according to another aspect of the present invention includes the above-described optical filter.

According to the present invention, it is possible to provide an optical filter having an excellent infrared selective transmitting property that is excellent in visible light shielding property and infrared transmitting property and in which a transmittance changes steeply in a wavelength range ranging from a visible wavelength range to an infrared wavelength range. Further, according to the present invention, it is possible to provide a highly sensitive device including such an optical filter.

DETAILED DESCRIPTION

Hereinafter, there will be explained embodiments of the present invention.

(First Embodiment)

Figure 1:
FIG. 1 is a cross-sectional view illustrating one example of an optical filter according to a first embodiment.

FIG. 1 is a cross-sectional view schematically illustrating an optical filter according to a first embodiment of the present invention. The optical filter according to this embodiment is an optical filter useful for usage in which shielding visible light and selectively transmitting infrared light are required, for example, for usage of an imaging device such as an infrared camera, an infrared sensor, an infrared communication device to be mounted on a mobile phone, a PC, or the like, an infrared remote control device of a home electric appliance such as a television, an audio unit, or an air-conditioner, a biometric authentication apparatus using infrared light such as vein authentication or iris authentication, a motion sensor, a three-dimensional range imaging camera, and the like.

As illustrated in FIG. 1, the optical filter according to this embodiment includes a structure 1 containing a transparent resin, and a green coloring matter and a black coloring matter dispersed or dissolved in the transparent resin.

The optical filter may include an infrared transmitting substrate transmitting at least light in an infrared wavelength range, concretely light with a wavelength of 700 nm or more on one side (one principal surface) or both sides (both principal surfaces) of the structure 1.

Further, the optical filter may include a functional layer containing at least one layer out of an anti-reflection layer composed of an inorganic film or an organic film, a protective layer having a passivation function, a protective layer having abrasion resistance, an adhesive layer, and the like on one side or both sides of the structure 1 or the structure 1 including the infrared transmitting substrate(s). When the anti-reflection layer or the infrared transmitting substrate is provided to cover the principal surface of the structure 1, normally, the anti-reflection layer or the infrared transmitting substrate has a passivation function additionally, and thus the protective layer does not need to be provided in many cases. Incidentally, when covering the principal surface of the structure 1, the protective layer may be formed to protect only the principal surface on which light is incident of the structure 1, or may be formed to cover and protect side surfaces as well as the principal surface, though not illustrated.

FIG. 2 to FIG. 7 illustrate other examples of the optical filter according to the first embodiment. However, the composition of the optical filter is not limited to these examples.

Figure 2:
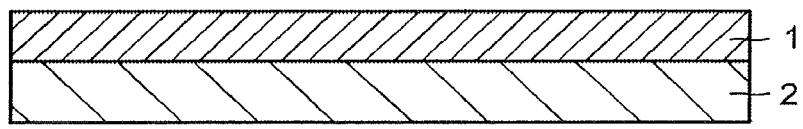
FIG. 2 is a cross-sectional view illustrating another example of the optical filter according to the first embodiment.

FIG. 2 is an example where an infrared transmitting substrate 2 is provided on one principal surface of the structure 1.

"Providing (or having) another layer such as the infrared transmitting substrate 2 on one principal surface of the structure 1" herein is not limited to the case where the another layer is provided in contact with the structure 1, and is understood to include also the case where another functional layer is provided between the structure 1 and the another layer, and the same is true for the following examples.

Figure 3:
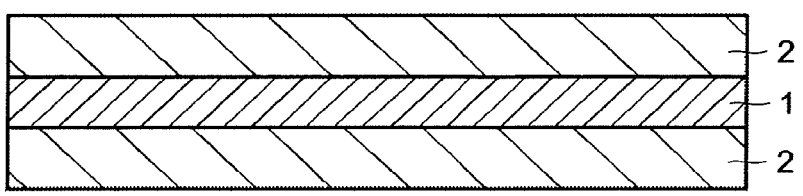
FIG. 3 is a cross-sectional view illustrating another example of the optical filter according to the first embodiment.

FIG. 3 is an example where the infrared transmitting substrate 2 provided on both principal surfaces of the structure 1.

Figure 4:
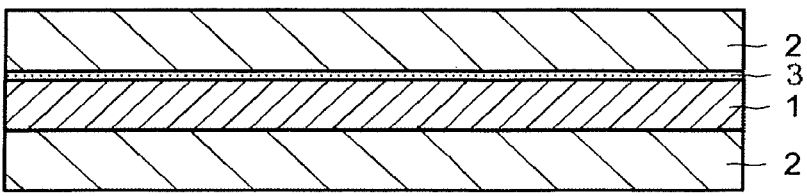
FIG. 4 is a cross-sectional view illustrating another example of the optical filter according to the first embodiment.

FIG. 4 is an example where one of the infrared transmitting substrates 2 in the optical filter in FIG. 3 is provided on one principal surface of the structure 1 with an adhesive layer 3 interposed therebetween. In the optical filter in FIG. 4, the infrared transmitting substrate 2 may be provided on each of both principal surfaces of the structure 1 with the adhesive layer 3 interposed therebetween, though not illustrated.

In the optical filters illustrated in FIG. 3 and FIG. 4, materials composing the two infrared transmitting substrates 2, their thicknesses, and the like may be the same or different.

Figure 5:
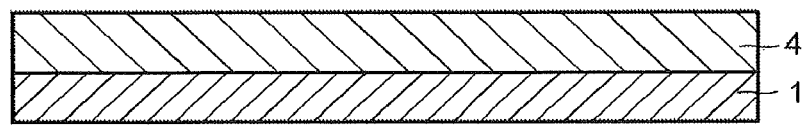
FIG. 5 is a cross-sectional view illustrating another example of the optical filter according to the first embodiment.

FIG. 5 is an example where a functional layer 4 is provided on one principal surface of the structure 1.

Figure 6:
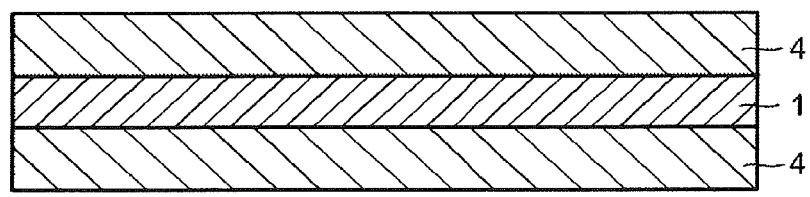
FIG. 6 is a cross-sectional view illustrating another example of the optical filter according to the first embodiment.

FIG. 6 is an example where the functional layer 4 is provided on both principal surfaces of the structure 1. The two functional layers 4 may be the same or different.

Figure 7:
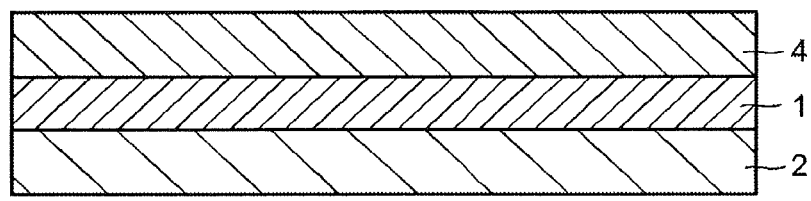
FIG. 7 is a cross-sectional view illustrating another example of the optical filter according to the first embodiment.

FIG. 7 is an example where the infrared transmitting substrate 2 is provided on one principal surface of the structure 1 and the functional layer 4 is provided on the other principal surface thereof.

Hereinafter, the structure, the infrared transmitting substrate, the anti-reflection layer, the protective layer, and the like composing the optical filter according to the first embodiment will be explained.

(Structure)

The structure contains a transparent resin, and a green coloring matter and a black coloring matter that are dispersed or dissolved in this transparent resin.

A shape, a thickness, and the like of the structure are determined appropriately according to an arrangement space in a device, required optical characteristics, and the like. Generally, the shape is a plate shape or a film shape, and the thickness is 0.1 µm to 100 µm. When the thickness is less than 0.1 µm, there is a concern that desired optical characteristics cannot be exhibited sufficiently. Further, when the thickness exceeds 100 µm, flatness decreases, and there is a concern that an in-plane dispersion in transmittance occurs. For the purpose of achieving both the optical characteristics and the flatness, the thickness is preferably 0.3 µm to 50 µm.

The structure includes optical characteristics satisfying the following requirements (i) and (ii). As used herein, the term "transmittance" or "average transmittance" means a transmittance or an average transmittance in a spectral transmittance curve of a 0-degree incident angle, namely a transmittance or an average transmittance in a spectral transmittance curve of light incident vertically to the principal surface," unless otherwise noted.

(i) An average transmittance of light in the wavelength range of 400 to 730 nm is 2% or less.

The average transmittance is preferably 1% or less, and more preferably 0.5% or less.

(ii) A continuous 50 nm wavelength range where an average transmittance is 80% or more exists in the wavelength range of 800 to 1000 nm.

The average transmittance is preferably 85% or more and more preferably 90% or more.

The structure further preferably satisfies at least one of the following requirements (iii) to (vi).

(iii) A transition wavelength range where the transmittance shifts to 80% from 10% exists in the wavelength of 730 to 860 nm, and a variation of the transmittance in this transition wavelength range is 0.75%/nm or more.

The variation of the transmittance in the transition wavelength range is preferably 1.00%/nm or more, more preferably 1.25%/nm or more, further preferably 1.50%/nm or more, and still more preferably 2.00%/nm or more. The "variation" mentioned here corresponds to an average value of a gradient (%/nm) when the transmittance shifts to 80% from 10%.

The variation of the transmittance in the above-described transition wavelength range is a value obtained by the following expression.

$$D(\%/nm)=[T_{\lambda 1}(\%)-T_{\lambda 2}(\%)]/[\lambda 1 \text{ (nm)}-\lambda 2 \text{ (nm)}]$$

(where D is the variation of the transmittance in the transition wavelength range, λ1 and λ2 are a wavelength of a long-wavelength side end and a wavelength of a short-wavelength side end in the transition wavelength range respectively, $T_{\lambda 1}$ is a transmittance in the wavelength λ1 of a spectral transmittance curve, and $T_{\lambda 2}$ is a transmittance in the wavelength λ2 of the spectral transmittance curve.)

That is, in the above-described expression, $T_{\lambda 1}(\%)=80(\%)$ and $T_{\lambda 2}(\%)=10\%$ are satisfied, so that the following can be expressed.

$$D(\%/nm)=70(\%)/[\lambda 1 \text{ (nm)}-\lambda 2 \text{ (nm)}]$$

(iv) A transmittance of light in the wavelength range of 400 to 730 nm is 10% or less.

The transmittance is preferably 5% or less, more preferably 3% or less, further preferably 1% or less, still more preferably 0.5% or less, and particularly preferably 0.3% or less.

(v) An average transmittance of light in the wavelength range of 900 to 1100 nm is 80% or more.

The average transmittance is preferably 85% or more and more preferably 90% or more.

(vi) A transmittance of light in the wavelength range of 900 to 1100 nm is 80% or more.

The transmittance is preferably 85% or more, and more preferably 90% or more.

The structure preferably satisfies the following requirement (vii).

(vii) An average value ($S_{ave}$) of the ratio of a light amount of scattered light to a light amount of incident light in the wavelength of 850 to 950 nm is 1% or less.

The average value ($S_{ave}$) is preferably 0.5% or less.

The above-described average value ($S_{ave}$) of the ratio of the light amount of scattered light to the light amount of incident light is a value obtained by the following expression, wherein Iin represents the incident light amount of light irradiated on the structure using a light source that emits light in the wavelength of 850 to 950 nm, It represents the total transmitted light amount of the irradiated light, and Id represents the scattered light amount of the irradiated light.

$$S_{ave}(\%)=(\text{scattered light transmittance } Td/\text{total transmittance } Tt) \times 100$$

(where Td=(Id/Iin)×100 and Tt=(It/Iin)×100)

Not only in the optical filter according to this embodiment, but also in an optical filter according to a second embodiment, particularly, the requirements (i) and (ii) are desirably satisfied based on the optical characteristics obtainable by the structure. Further, in the optical filter according to this embodiment, in addition to the requirements (i) and (ii), it is preferred to satisfy at least one of the requirements (iii) to (vi), and it is more preferred to satisfy all the requirement (iii) to (vi). Further, the optical filter according to this embodiment preferably includes the optical characteristics satisfying the requirement (vii).

<Green Coloring Matter>

Examples of the green coloring matter includes a squarylium-based coloring matter, a phthalocyanine-based coloring matter, and a cyanine-based coloring matter. One or more coloring matters can be appropriately selected from these coloring matters according to usage or the like to be used. The green coloring matter may be a pigment the molecules of which exist in the transparent resin in a dispersed manner as described later, but a green dye the molecules of which exist in the transparent resin in a dissolved manner is preferred because it has less concern for occurrence of scattered light.

a. Squarylium-based Coloring Matter

The squarylium-based coloring matter is preferred to be a coloring matter having a maximum absorption wavelength in the wavelength range of 600 to 800 nm in an absorption spectrum of light in the wavelength range of 400 to 1000 nm measured using a resin film produced by dispersing the coloring matter in the transparent resin. Further, a gradient on the infrared light side of an absorption peak exhibited by the maximum absorption wavelength is preferred to be steep.

Use of the squarylium-based coloring matter having such absorption characteristics makes it possible to obtain a structure satisfying, in addition to the aforementioned requirements, at least one of the following requirements, and further to obtain an optical filter including this structure.

An average transmittance of light in the wavelength range of 800 to 900 nm is 80%. The average transmittance is preferably 85% or more, and more preferably 90% or more.

A transition wavelength range where the transmittance shifts to 80% from 10% exists in the wavelength range of 730 to 800 nm, and a variation of the transmittance of light in the transition wavelength range is 0.75%/nm or more. The variation is preferably 1.00%/nm or more, more preferably 1.25%/nm or more, further preferably 1.50%/nm or more, and still more preferably 2.00%/nm or more.

A transmittance of light in the wavelength range of 800 to 900 nm is 80% or more. The transmittance is preferably 85% or more, and more preferably 90% or more.

As the squarylium-based coloring matter, a squarylium-based coloring matter of General formula (A1) is particularly preferred. Herein, a coloring matter of Formula (A1) is described as a coloring matter (A1) unless otherwise stated. Coloring matters of other formulas are also described similarly. Further, a group of Formula (1) is described as a group (1). Groups of other formulas are described similarly.

[Chemical formula 1]

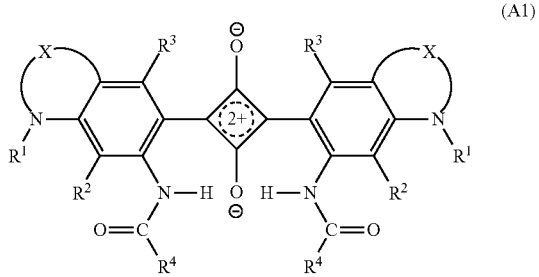

(A1)

Symbols in Formula (A1) are as follows.

Each X is, independently, a bivalent organic group of Formula (1) or Formula (2) where one or more hydrogen atoms may be substituted with a $C_1$-$C_{12}$ alkyl or alkoxy group:

  (1)

(where n1 is 2 or 3)

  (2)

(where n2 and n3 are each independently an integer of 0 to 2, and n2+n3 is 1 or 2).

Each $R^1$ is, independently, a saturated or unsaturated $C_1$-$C_{12}$ hydrocarbon group which may include a saturated ring structure and may be branched, a saturated $C_3$-$C_{12}$ cyclic hydrocarbon group, a $C_6$-$C_{12}$ aryl group or a $C_7$-$C_{13}$ alaryl group.

$R^2$ and $R^3$ are each independently a hydrogen atom, or a $C_1$-$C_{10}$ alkyl or alkoxy group.

Each $R^4$ is, independently, an optionally branched $C_1$-$C_{25}$ hydrocarbon group where one or more hydrogen atoms may be substituted with a hydroxyl group, a carboxyl group, a sulfone group, or a cyano group, and an unsaturated bond, an oxygen atom, or a saturated or unsaturated ring structure may be contained between carbon atoms.

In the above, the saturated or unsaturated ring structure refers to a hydrocarbon ring and a heterocycle having an oxygen atom as an annular atom. Further, a structure in which a $C_1$-$C_{10}$ alkyl group is bonded to a carbon atom constituting a ring is also included in this category.

Further, the aryl group refers to a group that is bonded via a carbon atom constituting an aromatic ring that an aromatic compound has, for example, a benzene ring, a naphthalene ring, biphenyl, a furan ring, a thiophene ring, a pyrrole ring, or the like. The alaryl group refers to a linear chain or branched, saturated or unsaturated hydrocarbon group or a saturated cyclic hydrocarbon group, which may contain a saturated ring structure, which is substituted with one or more aryl groups.

In Formula (2), a position of the oxygen atom is not particularly limited. That is, a nitrogen atom and an oxygen atom may be bonded, or an oxygen atom may be bonded directly to the benzene ring. Further, an oxygen atom may be positioned so as to be sandwiched by carbon atoms.

X on the left and right sides in the coloring matter (A1) may be the same or different, but, they are preferably the same from the viewpoint of productivity. Further, $R^1$ to $R^4$ may be the same or different on the left and right sides across the squarylium skeleton, but, they are preferably the same from the viewpoint of productivity.

As the squarylium-based coloring matter, in the coloring matter (A1), a coloring matter (A11) and a coloring matter (A12) of Formulas (A11) and (A12) respectively are more preferred. In Formulas (A11) and (A12), the meaning of $R^1$ to $R^4$ is the same as that of $R^1$ to $R^4$ in the coloring matter (A1). Further, Me represents a methyl group.

[Chemical formula 2]

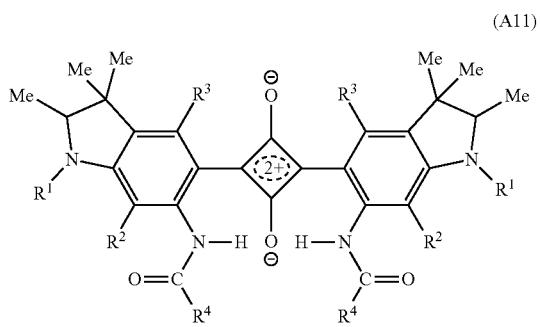

(A11)

[Chemical formula 3]

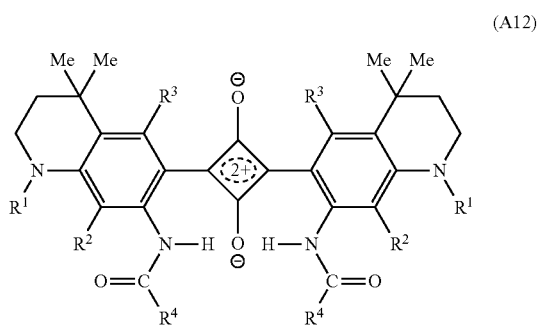

(A12)

In the coloring matter (A1), from the viewpoint of heat resistance and reliability improvement, each $R^1$ is, independently, preferably a $C_1$-$C_{12}$ alkyl or alkoxy group that may independently have a branched chain, and more preferably a $C_1$-$C_6$ alkyl or alkoxy group that may have a branched chain. In order to increase solubility to the transparent resin, a $C_1$-$C_6$ alkyl group that has a branched chain is further preferred.

Further, in the coloring matter (A1), $R^2$ and $R^3$ are independently preferably a hydrogen atom, or a $C_1$-$C_6$ alkyl or alkoxy group. $R^2$ and $R^3$ are each more preferably a hydrogen atom.

$R^4$ in the coloring matter (A1) is preferably a branched $C_5$-$C_{25}$ hydrocarbon group of Formula (4).

  (4)

In the formula (4), m is 1, 2 or 3, $R^{13}$ each independently represents a linear or branched hydrocarbon group, (which is branched when m is 1), that may include an unsaturated bond, an oxygen atom, or a saturated or unsaturated ring structure between carbon atoms, and the total of carbon numbers of m number of $R^{13}$ is 4 to 24. From the viewpoint of solubility to the transparent resin, m is preferably 2 or As the saturated ring structure that $R^{13}$ may have, there can be cited cyclic ether, cycloalkane, an adamantane ring, a diadamantane ring, and so on with a carbon number of 4 to 14. Further, as the unsaturated ring structure, there can be cited benzene, toluene, xylene, furan, benzofuran, and so on. When the ring structure is included, the carbon number of $R^{13}$ is indicated by a number including the carbon number of the ring.

Further, each $R^4$ is, independently, preferably a branched hydrocarbon group with a carbon number of 6 to 20 that independently has no substituent, from the viewpoint of solubility to an organic solvent and the transparent resin. The carbon number of $R^4$ is more preferably 6 to 17, and further preferably 6 to 14.

As $R^4$ in the coloring matter (A1), in the group (4), groups of the following Formulas (1a) and (1b) are preferred as the group of m=1, groups of Formulas (2a) to (2e) are preferred as the group of m=2, and groups of Formulas (3a) to (3e) are preferred as the group of m=3. Among them, the groups (1b), (2a) to (2e), and (3b) are particularly preferred from the viewpoint of solubility.

[Chemical formula 4]

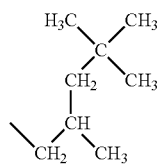
(1a)

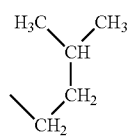
(1b)

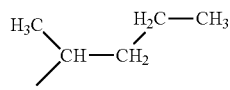
(2a)

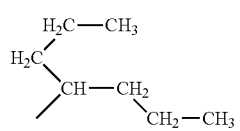
(2b)

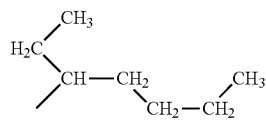
(2c)

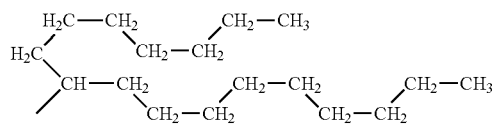
(2d)

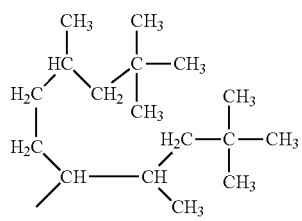
(2e)

[Chemical formula 5]

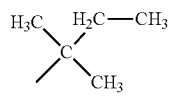
(3a)

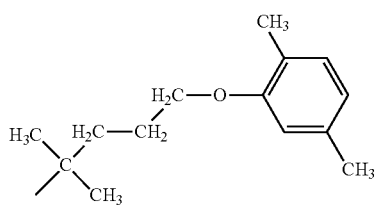
(3b)

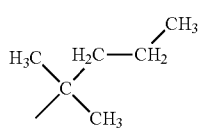
(3c)

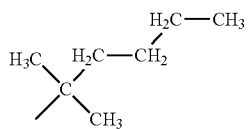
(3d)

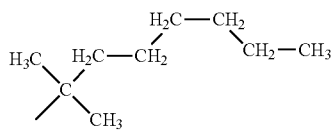
(3e)

The squarylium-based coloring matter is more preferably the coloring matter (A11), and in the coloring matter (A11), coloring matters (A11-1) to (A11-19) illustrated in Table 1 are particularly preferred from the viewpoint of solubility and coloring matter heat resistance, and the like In Table 1, "-" means a hydrogen atom. n-$C_3H_7$ represents a linear propyl group, and i-$C_3H_7$ represents a 1-methylethyl group. Concrete structures of $R^4$ in Table 1 correspond to Formulas (1a), (1b), (2a) to (2e), and (3a) to (3e). Corresponding coloring matter codes are also illustrated in Table 1. Incidentally, in the coloring matters (A11-1) to (A11-19), one $R^1$ existing on the left side and one $R^1$ existing on the right side, namely, two $R^1$ in total, are the same on the left and right sides, and the same is true for $R^2$ to $R^4$.

TABLE 1

| Coloring matter code | $R^1$ | $R^2$ | $R^3$ | $R^4$ |
|---|---|---|---|---|
| A11-1 | $CH_3$ | — | — | 1a |
| A11-2 | $CH_3$ | — | — | 1b |
| A11-3 | $CH_3$ | — | — | 2a |
| A11-4 | $CH_3$ | — | — | 2b |
| A11-5 | $CH_3$ | — | — | 2c |
| A11-6 | $CH_3$ | — | — | 2d |
| A11-7 | $CH_3$ | — | — | 2e |
| A11-8 | $CH_3$ | — | — | 3a |
| A11-9 | $CH_3$ | — | — | 3b |
| A11-10 | $CH_3$ | — | — | 3c |
| A11-11 | $C_2H_5$ | — | — | 2c |
| A11-12 | $C_2H_5$ | — | — | 3b |
| A11-13 | n-$C_3H_7$ | — | — | 2c |
| A11-14 | i-$C_3H_7$ | — | — | 2c |
| A11-15 | $C(CH_3)_2$—$C_2H_5$ | — | — | 2c |
| A11-16 | $C(CH_3)_2$—$C_2H_5$ | — | — | 3b |

TABLE 1-continued

| Coloring matter code | $R^1$ | $R^2$ | $R^3$ | $R^4$ |
|---|---|---|---|---|
| A11-17 | $C(CH_3)_2-C_2H_5$ | — | — | 3c |
| A11-18 | $C(CH_3)_2-C_2H_5$ | — | — | 3d |
| A11-19 | $C(CH_3)_2-C_2H_5$ | — | — | 3e | b. Phthalocyanine-based Coloring Matter

The phthalocyanine-based coloring matter is preferred to be a coloring matter having a maximum absorption wavelength in the wavelength range of 700 to 900 nm in an absorption spectrum of light in the wavelength range of 400 to 1000 nm measured using a resin film produced by dispersing the coloring matter in the transparent resin. Further, a gradient on the infrared light side of an absorption peak exhibited by the maximum absorption wavelength is preferred to be steep.

Use of the phthalocyanine-based coloring matter having such absorption characteristics makes it possible to obtain a structure satisfying at least one of the following requirements, and further to obtain an optical filter including this structure.

An average transmittance of light in the wavelength range of 860 to 1000 nm is 80% or more. The average transmittance is preferably 85% or more, and more preferably 90% or more.

A transition wavelength range where the transmittance shifts to 80% from 10% exists in the wavelength range of 760 to 860 nm and a variation of the transmittance of light in the transition wavelength range is 0.75%/nm or more. The variation is preferably 1.00%/nm or more, more preferably 1.25%/nm or more, further preferably 1.50%/nm or more, and still more preferably 2.00%/nm or more.

A transmittance of light in the wavelength range of 860 to 1000 nm is 80% or more. The transmittance is preferably 85% or more, and more preferably 90% or more.

As the phthalocyanine-based coloring matter, a phthalocyanine-based coloring matter of Formula (B1) or (B2) is particularly preferred.

[Chemical formula 6]

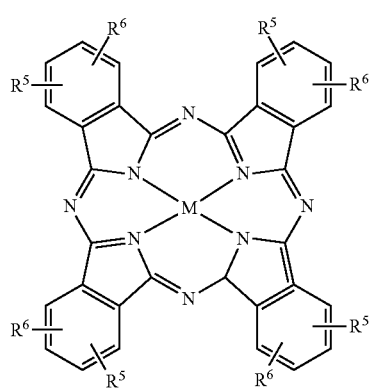

(B1)

[Chemical formula 7]

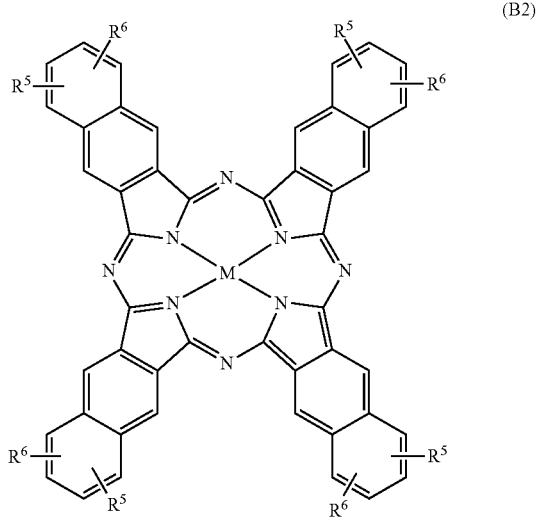

(B2)

In Formulas (B1) and (B2), M represents two hydrogen atoms, two monovalent metal atoms, or a substituted metal atom having a trivalent or quadrivalent metal atom. From the viewpoint of an absorption coefficient in the wavelength of 700 to 900 nm and light resistance, M is preferably Cu, Ni, Co, Zn, Pd, VO, and TiO.

Further, in Formulas (B1) and (B2), $R^5$ and $R^6$ are each independently an optionally branched $C_1$-$C_{25}$ hydrocarbon group where one or more hydrogen atoms may be substituted with a hydroxyl group, a carboxyl group, fluorine, or a cyano group, and an unsaturated bond, oxygen, or a saturated or unsaturated ring structure may be contained between carbon atoms, or a group of Formula (B-a), Formula (B-b), or Formula (B-c).

[Chemical formula 8]

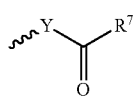

(B-a)

(B-b)

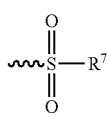

(B-c)

In Formula (B-a), Formula (B-b), and Formula (B-c), Y is oxygen or sulfur, and $R^7$ is an optionally branched $C_1$-$C_{25}$ hydrocarbon group where one or more hydrogen atoms may be substituted with a hydroxyl group, a carboxyl group, fluorine, or a cyano group, and an unsaturated bond, oxygen, or a saturated or unsaturated ring structure may be contained between carbon atoms.

From the viewpoint of solubility to the resin and the solvent, $R^5$ and $R^6$ are preferably the groups (B-a) and (B-b).

c. Cyanine-based Coloring Matter

As the cyanine-based coloring matter, a cyanine-based coloring matter of Formula (C1) or (C2) is particularly preferred.

[Chemical formula 9]

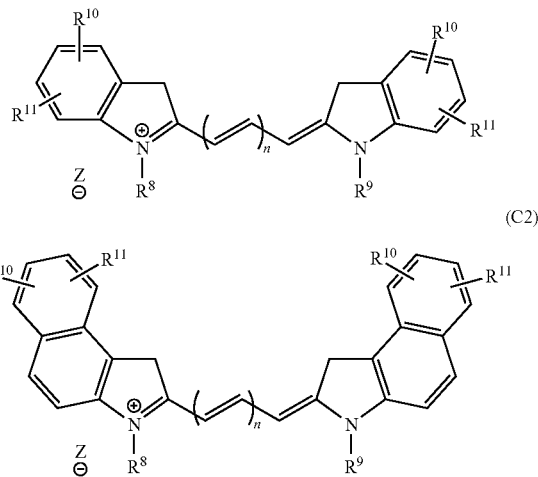

In Formulas (C1) and (C2), $R^8$ and $R^9$ each independently represent a hydrogen atom, a hydroxyl group, a carboxyl group, a methyl group, a long-chain or branched alkyl group, or aralkyl group. The alkyl group and the aralkyl group may contain an oxyethylene chain.

$R^{10}$ and $R^{11}$ each independently represent a hydrogen atom, a hydroxyl group, a carboxyl group, a methyl group, a long-chain or branched alkyl group, an aralkyl group, an amino group, a nitro group, long-chain alkylamine, an amide group, or an imide group. Formulas (C1) and (C2) each represent a compound having two substituents, but it may be a compound having three or more substituents.

Z represents an iodine atom, $-NO_3$, $-PF_6$, or $-N(SO_2CF_3)_2$.

n is an integer of 1 to 4.

Besides the above-described coloring matters, as the green coloring matter, there can be used a metal complex-based coloring matter such as a squarylium metal complex-based coloring matter, an indoaniline chelate coloring matter, an indonaphthol chelate coloring matter, an azo chelate coloring matter, a dithiol complex, or a dithiolene complex, a xanthene-based coloring matter, a dipyrromethene-based coloring matter, an anthraquinone-based coloring matter, a diketopyrrolopyrrole-based coloring matter, an imonium coloring matter, a diimonium coloring matter, a croconium coloring matter, or the like.

The green coloring matter may be a dye the molecules of which exist in the transparent resin in a dissolved manner, or may also be a pigment the molecules of which exist in the transparent resin in a dispersed manner. When the pigment is used as the green coloring matter, a dispersing agent can also be used. As the dispersing agent, a cationic dispersing agent, an anionic dispersing agent, a nonionic dispersing agent, or the like can be used.

<Black Coloring Matter>

The black coloring matter may be not only one that exhibits a black color alone (narrowly defined black coloring matter), but also a mixture exhibiting a black color by mixing two or more coloring matters. The mixture may be a mixture of the narrowly defined black coloring matter and another color coloring matter. Incidentally, in the case of a mixed-based black coloring matter, the aforementioned green coloring matter is excluded.

The black coloring matter may be a pigment the molecules of which exist in the transparent resin in a dispersed manner, but a black coloring dye the molecules of which exist in the transparent resin in a dissolved manner is preferred because it has less concern for occurrence of scattered light.

Concretely, as a dye composing a black dye, dyes such as an azo base, an anthraquinone base, a perinone base, a perylene base, a methine base, a quinoline base, an azine base, and so on can be cited as an example.

Concrete examples of the azo-based dye include C.I. solvent yellow 14, C.I. solvent yellow 16, C.I. solvent yellow 21, C.I. solvent yellow 61, C.I. solvent yellow 81, C.I. solvent red 1, C.I. solvent red 2, C.I. solvent red 8, C.I. solvent red 19, C.I. solvent red 23, C.I. solvent red 24, C.I. solvent red 27, C.I. solvent red 31, C.I. solvent red 83, C.I. solvent red 84, C.I. solvent red 121, C.I. solvent red 132, C.I. solvent violet 21, C.I. solvent black 3, C.I. solvent black 4, C.I. solvent black 21, C.I. solvent black 23, C.I. solvent black 27, C.I. solvent black 28, C.I. solvent black 31, C.I. solvent orange 7, C.I. solvent orange 9, C.I. solvent orange 37, C.I. solvent orange 40, C.I. solvent orange 45, and so on.

Concrete examples of the anthraquinone-based dye include C.I. solvent red 52, C.I. solvent red 111, C.I. solvent red 149, C.I. solvent red 150, C.I. solvent red 151, C.I. solvent red 168, C.I. solvent red 191, C.I. solvent red 207, C.I. solvent blue 35, C.I. solvent blue 36, C.I. solvent blue 63, C.I. solvent blue 78, C.I. solvent blue 83, C.I. solvent blue 87, C.I. solvent blue 94, C.I. solvent blue 97, C.I. solvent green 3, C.I. solvent green 20, C.I. solvent green 28, C.I. solvent violet 13, C.I. solvent violet 14, C.I. solvent violet 36, and so on.

Concrete examples of the perinone-based dye include C.I. solvent orange 60, C.I. solvent orange 78, C.I. solvent orange 90, C.I. solvent violet 29, C.I. solvent red 135, C.I. solvent red 162, C.I. solvent orange 179, and so on.

Concrete examples of the perylene-based dye include C.I. solvent green 5, C.I. solvent orange 55, C.I. vat red 15, C.I. vat orange 7, and so on.

Concrete examples of the methine-based dye include C.I. solvent orange 80, C.I. solvent yellow 93, and so on.

Concrete examples of the quinoline-based dye include C.I. solvent yellow 33, C.I. solvent yellow 98, C.I. solvent yellow 157, and so on.

Concrete examples of the azine-based dye include C.I. solvent black 5, C.I. solvent black 7, and so on.

Among the above-described black dyes, use of the azo-based dye having a large absorption coefficient and high solubility is preferred. Further, from the viewpoint of environmental conservation, one not containing a halogen element in a molecule is preferred.

The black coloring matter may be a dye the molecules of which exist in the transparent resin in a dissolved manner, or may also be a pigment the molecules of which exist in the transparent resin in a dispersed manner. When the pigment is used as the black coloring matter, a dispersing agent can also be used by request. The dispersing agent can be used for the purpose of uniformly dispersing the green coloring matter into the transparent resin, and concretely, a cationic dispersing agent, an anionic dispersing agent, a nonionic dispersing agent, and so on can be cited.

The total of the contents of the above-described green coloring matter and black coloring matter in the structure preferably falls within a range of 0.1 to 50 parts by mass to 100 parts by mass of the transparent resin normally. By setting the total to 0.1 parts by mass or more, desired optical characteristics can be obtained, and by setting the total to 50 parts by mass or less, a decrease in optical characteristics and the aforementioned scattered light can be suppressed. From these viewpoints, the range of 0.5 to 40 parts by mass is more preferred, and the range of 1 to 3 parts by mass is more preferred.

Further, as for a ratio between the green coloring matter and the black coloring matter, depending on the type or the like of the coloring matter, the ratio of the black coloring matter/the green coloring matter normally falls within a range of 1 to 10 by mass. This mixing ratio makes it possible to satisfy the requirements (i) and (ii).

<Transparent Resin>

The transparent resin composing the structure preferably has a glass transition temperature (Tg) of 0 to 380° C. The lower limit of Tg is more preferably 40° C. or more, still more preferably 60° C. or more, further preferably 70° C. or more, and particularly preferably 100° C. or more. Further, the upper limit of Tg is more preferably 370° C. or less, and still more preferably 360° C. or less. As long as Tg of the transparent resin is within the range of 0 to 380° C., deterioration or deformation due to heat can be suppressed during a manufacturing process or during use of this optical filter.

As concrete examples of the transparent resin, there can be cited a polyester resin, a polyether resin, an acrylic resin, a polyolefin resin, a cyclic olefin resin, a polycarbonate resin, an ene-thiol resin, an epoxy resin, a polyamide resin, a polyimide resin, a polyamide-imide resin, a polyurethane resin, a polystyrene resin, a polyarylate resin, a polysulfone resin, a polyethersulfone resin, a polyparaphenylene resin, a polyarylene ether phosphine oxide resin, and so on. Among them, the acrylic resin, the polyester resin, the polycarbonate resin, or the cyclic olefin resin is preferred. As the polyester resin, a polyethylene terephthalate resin, a polyethylene naphthalate resin, and so on are preferred. Further, in the usage requiring heat resistance, the polyester resin, the polycarbonate resin, and the polyimide resin, which are high in Tg, are preferred. It is possible to adjust a refractive index of the transparent resin by adjusting a molecular structure of a raw material component, or the like. Concretely, there can be cited a method in which a specific structure is given to a main chain and a side chain of a polymer of the raw material component. The structure given into the polymer is not particularly limited, but, for example, a fluorene skeleton can be cited. The transparent resin may be a polymer alloy in which a plurality of different resins are combined.

The transparent resin may be a resin made to have a high molecular weight beforehand, or a resin obtained in a manner that a low molecular weight substance is applied and polymerized (made to have a high molecular weight) by heat or an energy ray of ultraviolet light or the like to be cured. Incidentally, from the viewpoint of obtaining an optical filter excellent in durability by reducing damage on the coloring matters caused by a curing reaction using the heat or energy ray, use of the resin made to have a high molecular weight beforehand is preferred.

As the transparent resin, a commercial product may be used. As a commercial product of the acrylic resin, there can be cited OGSOL (registered trademark) EA-F5003 (manufactured by Osaka Gas Chemicals Co., Ltd., product name), polymethylmethacrylate, polyisobutylmethacrylate, BR50 (manufactured by Mitsubishi Rayon Co., Ltd., product name), and so on.

Further, as the polyester resin, there can be cited OKPH4HT, OKPH4, B-OKP2, and OKP-850 (each of which is manufactured by Osaka Gas Chemicals Co., Ltd., product name), and VYLON (registered trademark) 103 (manufactured by TOYOBO Co., Ltd., product name), and as the polycarbonate resin, there can be cited LeXan (registered trademark) ML9103 (manufactured by SABIC, product name), EP5000 (manufactured by MITSUBISHI GAS CHEMICAL COMPANY, INC., product name), SP3810 (manufactured by Teijin Chemicals Ltd., product name), SP1516 (manufactured by Teijin Chemicals Ltd., product name), TS2020 (manufactured by Teijin Chemicals Ltd., product name), XYLEX (registered trademark) 7507 (manufactured by SABIC, product name), and so on.

Further, as the cyclic olefin resin, there can be cited ARTON (registered trademark) (manufactured by JSR Corporation, product name, with Tg: 165° C.), ZEONEX (registered trademark) (manufactured by ZEON CORPORATION, product name, with Tg: 138° C.), and so on.

<Other Additives>

The structure may further contain, other than the green-based coloring matter and the black coloring matter, various optional components that the structure of this type normally contains within the range not impairing the effects of the present invention. As the optional components, there can be cited, for example, a color tone correcting coloring matter, a leveling agent, an antistatic agent, a heat stabilizer, a light stabilizer, an antioxidant, a dispersing agent, a flame retardant, a slip additive, a plasticizer, transparent nanoparticles, and so on.

As the antioxidant, there can be cited a hindered phenol-based compound, a phosphorus-based compound, a sulfur-based compound, an amine-based compound, and so on. Among them, from the viewpoint of infrared transmitting property, the hindered phenol-based compound is preferred. The hindered phenol-based compound is a compound in which a phenolic hydroxyl group has a substituent both at the 2-position and the 6-position. As the substituent, a methyl group or a t-butyl group is preferred. The hindered phenol-based compound may be any one of monophenols, bisphenols, and polyphenols.

As the light stabilizer, for example, a hindered amine-based compound can be used. As the hindered amine-based compound, a 2,2',6,6'-tetraalkylpiperidine derivative is preferred. As substituents on a nitrogen atom, a hydrogen atom, an alkyl group, and an alkoxy group are preferred. Further, the substituents at the 2-position and the 6-position are preferably an alkyl group or a phenyl group.

Further, for the purpose of adjusting a refractive index and increasing hardness of the structure, nanoparticles of an inorganic oxide material that is transparent in the infrared wavelength range may be contained. As such a material, there can be cited $Al_2O_3$, $SiO_2$, $GeO_2$, $Y_2O_3$, $La_2O_3$, $CeO_2$, $TiO_2$, $ZrO_2$, $Nb_2O_5$, $Ta_2O_5$, and so on.

Furthermore, a silane coupling agent, a thermal or photo-polymerization initiator, a component derived from a polymerization catalyst, and the like, which are components to be added to a coating liquid used when forming the structure, may be contained. The silane coupling agent has an effect of increasing adhesiveness of the structure to another composing member.

As the silane coupling agent, there can be cited, for example, 3-glycidoxypropyltrimethoxysilane, 3-glycidoxypropylmethyldiethoxysilane, 2-(3-,4-epoxycyclohexyl)ethyltrimethoxysilane, 3-(methacrylopropyl)trimethoxysilane, 3-mercaptopropyltrimethoxysilane, 3-mercaptopropylmethyldimethoxysilane, 3-aminopropyltriethoxysilane, 3-ureidopropyltriethoxysilane, N-2-aminoethyl-3-aminopropyltrimethoxysilane, N-2-aminoethyl-3-aminopropylmethyldiethoxysilane, N-phenyl-3- aminopropyltrimethoxysilane, bis(3-triethoxysilylpropyl) tetrasulfane, vinyltrimethoxysilane, and so on.

One of the above-described optional components may be used independently, or two or more of them may be used in combination.

<Forming Method of the Structure>

The structure can be formed in a manner that, for example, a squarylium-based coloring matter being a green coloring matter, a black coloring matter, a transparent resin or a raw material component of a transparent resin, and each component to be mixed according to need are dissolved or dispersed in a solvent to prepare a coating liquid, and the coating liquid is applied on a substrate to be dried and further cured according to need. When a black dye is used as the black coloring matter, the black dye is preferred because it has good solubility to both the transparent resin and the solvent used for the coating liquid, together with the squarylium-based coloring matter, resulting in that film uniformity can be obtained.

The above-described substrate may be a substrate applicable as a composing member of the optical filter according to this embodiment, or a substrate to be used only when forming the structure, for example, a peelable substrate.

As the substrate to be a composing member of the optical filter as it is, the infrared transmitting substrate can be cited. When the substrate to be a composing member is used as the substrate, a surface of this substrate, where the structure is formed, may be surface-treated beforehand with a silane coupling agent to increase adhesiveness between the structure and the substrate. For the silane coupling agent, the aforementioned silane coupling agent can be used.

Further, the peelable substrate is not limited in shape and material in particular as long as the substrate has peelability. Concretely, it is possible to use a glass plate, a release-treated plastic film, a film composed of a polyester resin such as polyethylene terephthalate or polybutylene terephthalate, a polyolefin resin such as polyethylene, polypropylene, or an ethylene-vinyl acetate copolymer, an acrylic resin such as polyacrylate or polymethylmethacrylate, an urethane resin, a vinyl chloride resin, a fluorocarbon resin, a polycarbonate resin, a polyvinylbutyral resin, a cycloolefin resin, a polyvinylalcohol resin, or the like, a stainless steel plate, or the like.

The structure using the peelable substrate can be formed by the following method, for example.

First, on the peelable substrate, the structure, the functional layer according to need, and the like are stacked by a later-described coating method. Next, a later-described adhesive layer, a commercially available slightly adhesive film, or the like is used to thereby transfer the structure from the peelable substrate. Finally, the transferred structure is applied to another part, to thereby obtain the optical filter illustrated in FIG. 1, FIG. 5, and FIG. 6.

The structure is formed by such a method, thereby allowing the optical filter according to the present invention to achieve a reduction in thickness without including the infrared transmitting substrate. In this case, the whole thickness of the optical filter is preferably 50 µm or less, more preferably 40 µm or less, and further preferably 30 µm or less regardless of presence or absence of the functional layer such as a protective layer.

The solvent used for preparation of the coating liquid is not particularly limited as long as it is a dispersion medium capable of stably dispersing or a solvent capable of dissolving the green coloring matter, the black coloring matter, the transparent resin or the raw material component of the transparent resin, and each component to be mixed according to need. Herein, a term of "solvent" is used as a concept including both of the dispersion medium and the solvent. As the solvent, there can be cited, for example, alcohols such as isopropylalcohol, n-butylalcohol, ethylcellosolve, and methylcellosolve, glycols such as ethyleneglycol, diethyleneglycol, and propyleneglycol, ketones such as methylethylketone, methylisobutylketone, cyclopentanone, and cyclohexanone, amides such as N,N-dimethylformamide, N,N-dimethylacetamide, and N-methyl-2-pyrrolidone, ethers such as ethyleneglycolmonomethylether, ethyleneglycol monoethylene ether, ethyleneglycolmonobutylether, diethyleneglycolmonomethylether, diethyleneglycolmonoethylether, diethyleneglycolbutylether, ethyleneglycolmonomethyletheracetate, ethyleneglycolmonoethyletheracetate, and ethyleneglycolmonobutyletheracetate, esters such as methyl acetate, ethyl acetate, and butyl acetate, aromatic series such as benzene, toluene, and xylene, or aliphatic hydrocarbons such as n-hexane and n-heptane, fluorine-based solvents such as tetrafluoropropylalcohol and pentafluoropropylalcohol, water, and so on. One of these solvents can be used independently or two or more of them can be used in combination.

The amount of the solvent is preferably 10 to 5,000 parts by mass, and more preferably 30 to 2,000 parts by mass to 100 parts by mass of the transparent resin or the raw material component of the transparent resin. The content of a non-volatile component (solid content) in the coating liquid is preferably 2 to 50 parts by mass, and more preferably 5 to 40 parts by mass to 100 parts by mass of the coating liquid.

It is also possible to contain a surface active agent in the coating liquid. When the surface active agent is contained, it is possible to improve an appearance, in particular, voids resulting from fine bubbles, dents caused by adhesion of foreign substances or the like, and crawling at a drying process. The surface active agent is not particularly limited, and it is possible to optionally use publicly-known one such as a cation-based, anion-based, or nonion-based surface active agent.

For the preparation of the coating liquid, a stirring device such as a magnetic stirrer, a planetary centrifugal mixer, a bead mill, a planetary mill, or an ultrasonic homogenizer can be used. The stirring may be performed continuously or intermittently.

For applying the coating liquid, for example, it is possible to use a coating method such as an immersion coating method, a cast coating method, a spray coating method, a spinner coating method, a bead coating method, a wire bar coating method, a blade coating method, a roller coating method, a curtain coating method, a slit die coater method, a gravure coater method, a slit reverse coater method, a micro gravure method, an ink-jet method, or a comma coater method. Besides, it is also possible to use a bar coater method, a screen printing method, a flexographic printing method, or the like.

By applying the above-described coating liquid on the aforementioned substrate and then drying it, the structure is formed. For the drying, it is possible to use a publicly-known method such as heat drying or hot-air drying. When the coating liquid contains the raw material component of the transparent resin, curing is further performed. When the reaction is thermal-curing, it is possible to simultaneously perform the drying and the curing, but, when the reaction is photo-curing, a curing process is provided separately from the drying. The structure formed on the peelable substrate is peeled off to be used for manufacture of this filter.

The structure can be manufactured in a film state by extrusion molding, depending on the type of the transparent resin, and furthermore, it is also possible that a plurality of films manufactured as above are stacked to be integrated by thermocompression bonding or the like.

(Infrared Transmitting Substrate)

A composing material of the infrared transmitting substrate is not limited in particular as long as it is a material that transmits infrared light, and inorganic materials such as glass and crystal and organic materials such as resin can be cited. This optical filter is required that the scattered light of the infrared light in particular is as little as possible, and thus the substrate to be used is also preferably one with less scattered light.

As resins that can be used for the infrared transmitting substrate, there can be cited a polyester resin such as polyethylene terephthalate or polybutylene terephthalate, a polyolefin resin such as polyethylene, polypropylene, or an ethylene-vinyl acetate copolymer, a cyclic olefin resin, a norbornene resin, an acrylic resin such as polyacrylate or polymethyl methacrylate, a urethane resin, a vinyl chloride resin, a fluorocarbon resin, a polycarbonate resin, a polyvinyl butyral resin, a polyvinyl alcohol resin, a polyimide resin, a polyetherimide resin, a polyamide resin, a polyamide-imide resin, and so on.

As the glass usable for the infrared transmitting substrate, there can be cited soda lime glass, borosilicate glass, crown glass, non-alkali glass, quartz glass, tempered glass obtained by ion exchange, and so on.

The tempered glass is used for a cover glass of a smartphone and a tablet terminal for the purpose of protecting a touch panel screen. Decorative printing of black, white, or/and the like is sometimes applied to an outer peripheral portion of the cover glass by screen printing or the like. In the case, it is possible to provide an opening portion in a portion other than a portion to which decorative printing is applied beforehand and directly apply the coating liquid to the opening portion by the above-described coating method. As above, direct application of the coating liquid makes it possible to obtain high productivity.

As the crystalline material capable of being used for the infrared transmitting substrate, there can be cited a birefringent crystal such as crystalline quartz, lithium niobate, or sapphire.

A thickness of the infrared transmitting substrate is not limited in particular, but, from the viewpoint of achieving a reduction in weight and a reduction in thickness, is preferably 0.01 to 1 mm and more preferably 0.05 to 0.3 mm.

In the case of manufacturing the structure as a single body, namely when forming the structure using a peelable substrate, or the like, for example, an adhesive can be used for stacking of the structure and the infrared transmitting substrate. The adhesive is not limited in particular as long as it transmits infrared light, but an adhesive that does not increase scattered light is preferred similarly to the infrared transmitting substrate. A thickness of the adhesive is preferably 0.5 to 50 μm, and more preferably 1 to 10 μm. When the thickness is less than 0.5 μm, there is a concern that a sufficient adhesive force cannot be obtained, and when it exceeds 50 μm, the whole optical filter becomes thick, and the transmittance could be low.

(Functional Layer)

As the functional layer, a layer containing at least one layer out of an anti-reflection layer, a protective layer having a passivation function, a protective layer having abrasion resistance, an adhesive layer for enabling adhesion to other optical parts, and so on can be cited.

The anti-reflection layer has a function of improving transmittance and effectively using incident light, and can be formed of well-known materials by a well-known method. Concretely, the anti-reflection layer is composed of a film of one or more layers of silica, titania, tantalum pentoxide, magnesium fluoride, zirconia, alumina or the like formed by a sputtering method, a vacuum deposition method, a plasma CVD method or the like, and a film of one or more layers formed by a sol-gel method, a coating method or the like. As a material using the sol-gel method, a silicate-based material can be cited. As a material using the coating method, there can be cited a silicone-based resin, an acrylic-based resin, a fluorinated acrylic-based resin, a cycloolefin resin, a fluorinated cycloolefin resin, and so on. Further, addition of silica fine particles and hollow silica fine particles enables achievement of low-refractive index and an improvement in abrasion resistance. A thickness of the anti-reflection layer is typically 100 to 2000 nm.

The protective layer is a layer having a function of preventing deterioration of desired characteristics caused when the structure or another component is located on the uppermost surface and the surface of the structure or the another component is exposed. Particularly, the structure contains the coloring matters, and therefore, when the coloring matter comes into contact with oxygen or air, there is a concern that a molecular structure of the coloring matter or the like changes and the characteristics are impaired, and thus, when the structure is located on the uppermost surface, it is preferred to provide the protective layer. Further, there is a concern that the molecular structure or the like of the coloring matter changes not only by oxygen or air, but also by light and desired characteristics are impaired. The change in the molecular structure caused by light occurs in a combined manner with the change caused by oxygen or air, so that providing the protective layer also makes it possible to suppress the change in characteristics caused by light. Incidentally, the protective layer may be formed on the structure or the another component so as to protect only the principal surface where light is incident, or though not illustrated, the protective layer may be formed so as to cover and protect side surfaces as well as the principal surface.

The protective layer is composed of an inorganic film or an organic film. A thickness of the protective layer is typically 0.2 to 20 μm.

As the inorganic film, there can be cited a film of one or more layers of silica, titania, tantalum pentoxide, niobium pentoxide, magnesium fluoride, zirconia, alumina or the like formed by a sputtering method, a vacuum deposition method, a plasma CVD method, or the like.

Further, as the organic film, there can be cited a polyester resin such as polyethylene terephthalate or polyethylene naphthalate, a thermoplastic resin such as a polycarbonate resin or a cyclic olefin resin, a thermosetting resin such as a polyimide resin, a polyamide-imide resin, or a polyetherimide resin, and an energy ray-curable resin such as an acrylic resin or an epoxy resin. When the thermosetting resin and the energy ray-curable resin are used, they only need to be cured in such a manner that a composition containing a polymerizable precursor compound of them is dropped onto the principal surface where, for example, the structure is exposed, a release-treated glass plate is placed on the principal surface, and energy ray irradiation is performed thereon. After curing, the glass plate is released and then a smooth organic film having a uniform thickness can be obtained. Flatness is preferably 30 nm or less and more preferably 10 nm or less. Achievement of high flatness makes it possible to reduce haze and an aberration. Incidentally, the "flatness" mentioned here indicates an arithmetic mean roughness Ra. It is possible to appropriately add, to the protective layer composed of the organic film, a component cited as another additive that can be added to the aforementioned structure. Particularly, use of nanoparticles of an inorganic oxide material that is transparent in the infrared wavelength range enables an improvement in abrasion resistance of the protective layer.

A refractive index of the organic film may substantially match the refractive index of the structure, and a refractive index difference between the both may be 0.2 or less, preferably 0.1 or less, and more preferably 0.05 or less. The refractive index mentioned here means a refractive index with respect to light of wavelength 589 nm. Reducing the refractive index difference enables a reduction in interference fringes, resulting in that it is possible to obtain a high-quality optical filter having excellent design.

The adhesive layer is a layer to be arranged on the uppermost surface of the optical filter, which comes into contact with the outside air, as a means for integration with other optical parts, and also refers to as an "uppermost surface adhesive layer" hereinafter. A surface on which the uppermost surface adhesive layer is provided is not limited in particular, and the uppermost surface adhesive layer can be arranged on either uppermost surface of the optical filter. For example, in the case of such an optical filter including the infrared transmitting substrate 2 provided on one principal surface of the structure 1 as illustrated in FIG. 2, it is possible to arrange the uppermost surface adhesive layer on one uppermost surface of the structure 1 side and the infrared transmitting substrate 2 side, or both uppermost surfaces of them. Further, in the case when the optical filter includes another functional layer and such an infrared reflection layer as described later, the uppermost surface adhesive layer can be arranged to be stacked on these layers, but when the functional layer is the anti-reflection film or the infrared reflection layer, for the purpose of obtaining desired reflection characteristics, the uppermost surface adhesive layer is preferably arranged on the side where the anti-reflection film or the infrared reflection layer are not arranged.

A refractive index of the uppermost surface adhesive layer is preferably substantially equal to the refractive index of the material of the surface where the uppermost surface adhesive layer is arranged. For example, a refractive index difference between the both is preferably 0.3 or less and more preferably 0.2 or less. Reducing the refractive index difference between the two layers enables suppression of an interface reflection and noise reduction. Incidentally, the refractive index mentioned here means a refractive index in the wavelength of 589 nm.

For the uppermost surface adhesive layer, for example, an acrylic-based or urethane-based adhesive tape with a high infrared transmittance can be used. Its adhesive force can be appropriately set according to an optical part to adhere thereto, but is normally 0.1 N/10 mm or more, preferably 1 N/10 mm or more, and more preferably 3 N/10 mm or more. Further, a thickness of the uppermost surface adhesive layer is preferably 5 to 50 μm, and more preferably 10 to 25 μm. When the thickness is less than 5 μm, there is a concern that a sufficient adhesive force cannot be obtained, and when it exceeds 50 μm, the whole optical filter becomes thick, and the transmittance is liable to decrease. As a commercial product example of the adhesive tape suitable for formation of the uppermost surface adhesive layer, highly transparent adhesive transfer tapes (OCA tape) 8171CL, 8146-1, and so on that are sold by 3M Japan Limited can be cited.

As the uppermost surface adhesive layer, a liquid adhesive can also be used. As the liquid adhesive, for example, there can be cited acrylic-based, urethane-based, epoxy-based, silicone-based adhesives, and so on. When the uppermost surface adhesive layer is composed of a liquid adhesive, the optical filter is bonded to other optical parts, and then is heated, or subjected to irradiation of energy ray of ultraviolet light or the like, and thereby the liquid adhesive can be cured.

The optical filter according to this embodiment includes the structure containing the green coloring matter and the black coloring matter, to thus be able to include an excellent infrared selective transmitting property that is excellent in visible light shielding property and infrared transmitting property and in which a transmittance changes steeply in a wavelength range ranging from a visible wavelength range to an infrared wavelength range.

Concretely, it is possible to include spectral transmittance characteristics in which an average transmittance of light in the wavelength range of 400 to 730 nm is 2% or less and that have a continuous 50 nm wavelength range where the average transmittance is 80% or more in the wavelength range of 800 to 1000 nm. As above, by having the continuous 50 nm wavelength range where the average transmittance is 80% or more, it is possible to maintain sufficient sensitivity in a specific band when performing transmission/reception in the infrared wavelength range by using the optical filter according to this embodiment, for example. Further, it is possible to include spectral transmittance characteristics in which a transmittance of light in the wavelength range of 400 to 730 nm is 10% or less, an average transmittance of light in the wavelength range of 900 to 1100 nm is 80% or more, or a transmittance of light in the wavelength range of 900 to 1100 nm is 80% or more.

(Second Embodiment)

Figure 8:
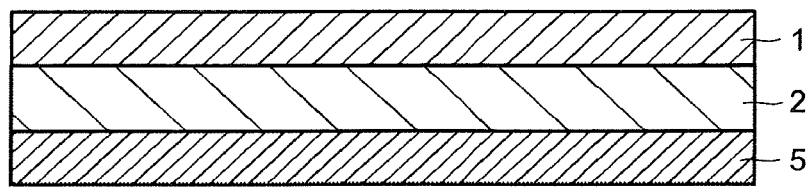
FIG. 8 is a cross-sectional view illustrating one example of an optical filter according to a second embodiment.

FIG. 8 is a cross-sectional view schematically illustrating a composition of an optical filter according to a second embodiment of the present invention. The optical filter according to this embodiment is an optical filter useful for usage in which shielding visible light and further shielding infrared light with a predetermined wavelength or more and selectively transmitting only infrared light in a specific wavelength range are required, for example, for usage of an infrared sensor that measures positions, distances, and the like using an infrared laser, and the like. In the explanation of this embodiment, for the purpose of avoiding overlapping explanation, explanation of the points common to those of the first embodiment is omitted, and differences will be mainly explained.

As illustrated in FIG. 8, the optical filter according to the second embodiment has a structure in which the infrared transmitting substrate 2 and an infrared reflection layer 5 composed of a dielectric multilayer film are provided in this order on one principal surface of the structure 1. Further, in the optical filter in FIG. 8, on the surface of the structure 1, the functional layer 4 such as an anti-reflection layer, which is not illustrated, may be provided.

The optical filter according to this embodiment may include the infrared transmitting substrate 2 on the both principal surfaces of the structure 1, or may also include the infrared transmitting substrate 2 and the infrared reflection layer 5 on the both principal surfaces of the structure 1.

FIG. 9 to FIG. 12 each illustrate another example of the optical filter according to the second embodiment. However, the composition of the optical filter is not limited to these examples.

Figure 9:
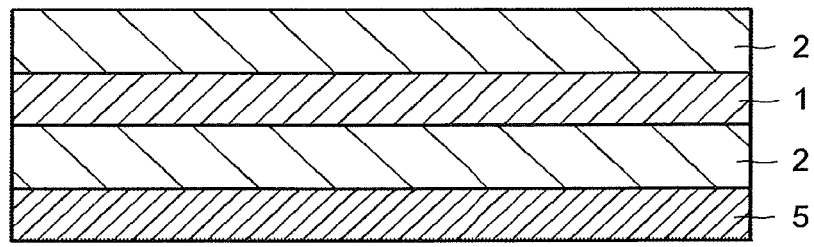
FIG. 9 is a cross-sectional view illustrating another example of the optical filter according to the second embodiment.

FIG. 9 is an example where the infrared transmitting substrate 2 is provided on one principal surface of the structure 1 and the infrared transmitting substrate 2 and the infrared reflection layer 5 are provided on the other principal surface thereof.

Figure 10:
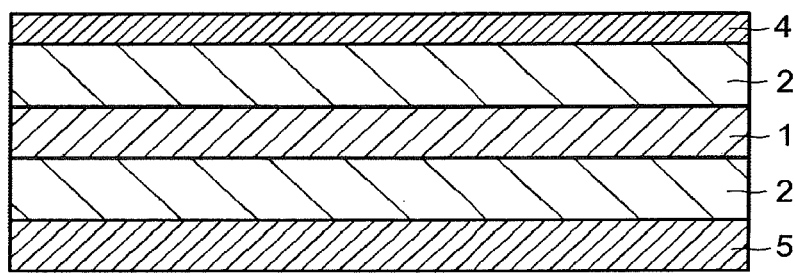
FIG. 10 is a cross-sectional view illustrating another example of the optical filter according to the second embodiment.

FIG. 10 is an example where the infrared transmitting substrate 2 and the infrared reflection layer 5 are provided on one principal surface of the structure 1 and the infrared transmitting substrate 2 and the functional layer 4 are provided on the other principal surface thereof.

Figure 11:
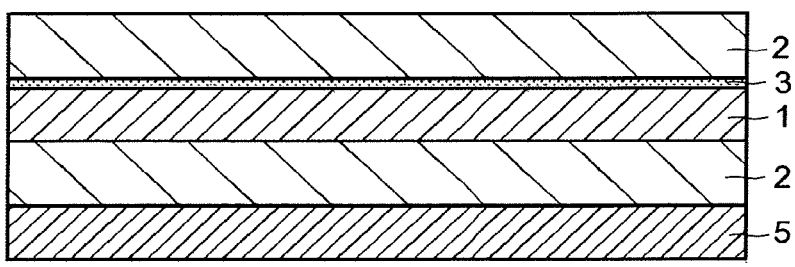
FIG. 11 is a cross-sectional view illustrating another example of the optical filter according to the second embodiment.
Figure 12:
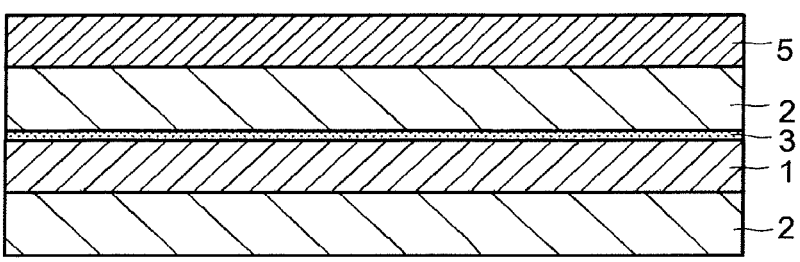
FIG. 12 is a cross-sectional view illustrating another example of the optical filter according to the second embodiment.

FIG. 11 and FIG. 12 each are an example where one of the two infrared transmitting substrates 2 in the optical filter in FIG. 9 is provided on one principal surface of the structure 1 with the adhesive layer 3 interposed therebetween. Incidentally, though not illustrated in the optical filters in FIG. 11 and FIG. 12, for example, the infrared transmitting substrate 2 may be provided on each of the both principal surfaces of the structure 1 with the adhesive layer 3 interposed therebetween.

In the optical filters having the compositions illustrated in FIG. 9 to FIG. 12, materials composing the two infrared transmitting substrates 2, their thicknesses, and the like may be the same or different.

Hereinafter, the infrared reflection layer composing the optical filter according to the second embodiment will be explained. Incidentally, the structure, the infrared transmitting substrate, the functional layer, and the like that compose this optical filter are the same as those explained in the first embodiment, and therefore their explanations are omitted.

(Infrared Reflection Layer)

The infrared reflection layer is composed of the dielectric multilayer film in which a dielectric film with a low-refractive index (low-refractive index film) and a dielectric film with a high-refractive index (high-refractive index film) are alternately stacked. Here, the low-refractive index and the high-refractive index mean that the infrared reflection layer has a low-refractive index and a high-refractive index with respect to the refractive index of an adjacent layer.

The refractive index of the high-refractive index film is preferably 1.6 or more and more preferably 2.2 to 2.5. Examples of a high-refractive index film material include $Ta_2O_5$, $TiO_2$, $Nb_2O_5$, and so on. Among them, $TiO_2$ is preferred from the points of reproducibility, stability, and the like in film formability, a refractive index, and the like.

In the meantime, the refractive index of the low-refractive index film is preferably less than 1.6, more preferably 1.35 or more and less than 1.55, and still more preferably 1.40 to 1.50. Examples of a low-refractive index film material include $SiO_2$, $SiO_xN_y$, and so on. $SiO_2$ is preferred from the points of reproducibility, stability, economy, and the like in film formability.

The infrared reflection layer exhibits a function of controlling transmitting and shielding of light in a specific wavelength range by utilizing interference of light, and there is incident angle dependence in its transmitting and shielding characteristics. In general, the wavelength of light shielded by reflection becomes a shorter wavelength for light incident obliquely than light incident vertically (incident angle of 0°).

In the optical filter including the infrared reflection layer in this embodiment, an average transmittance of light in the wavelength range of 800 to 900 nm in the spectral transmittance curve at an incident angle of 0°, for example, is preferably 80% or more, more preferably 90% or more, and further preferably 95% or more. Further, in the spectral transmittance curve at an incident angle of 0°, the optical filter has a wavelength at which the transmittance shifts to 5% or less in the wavelength range of 900 to 1100 nm and the transmittance on the long wavelength side relative to the wavelength of 900 nm is preferably 5% or less. The transmittance on the long wavelength side relative to the wavelength of 900 nm is more preferably 3% or less, and more preferably 1% or less. Incidentally, when the structure 1 includes two or more of the infrared reflection layers, the optical filter may be designed to have the above-described transmittance characteristics including these plural layers. The infrared reflection layer may be designed to include the above-described optical characteristics, thereby achieving the optical characteristics of the optical filter according to this embodiment. The optical filter including such an infrared reflection layer is applicable in conjunction with the structure containing various green coloring matters.

Further, in the optical filter including the infrared reflection layer, for example, an average transmittance of light in the wavelength range of 900 to 1000 nm in the spectral transmittance curve at an incident angle of 0° is preferably 80% or more, more preferably 90% or more, and further preferably 95% or more. Further, in the spectral transmittance curve at an incident angle of 0°, the optical filter has a wavelength at which the transmittance shifts to 5% or less in the wavelength range of 1000 to 1100 nm and the transmittance on the long wavelength side relative to the wavelength of 1000 nm is preferably 5% or less. The transmittance on the long wavelength side relative to the wavelength of 1000 nm is more preferably 3% or less, and more preferably 1% or less. Incidentally, also in this case, when the structure 1 includes two or more of the infrared reflection layers, the optical filter may be designed to have the above-described transmittance characteristics including these plural layers. The infrared reflection layer may be designed to include the above-described optical characteristics, thereby achieving the optical characteristics of the optical filter according to this embodiment. The optical filter including the above infrared reflection layer is applicable in conjunction with the structure containing various green coloring matters.

Further, the optical filter including the infrared reflection layer preferably has a continuous wavelength range of 15 nm or more in which the average transmittance is 80% or more in the wavelength range of 800 to 1000 nm in the spectral transmittance curve at an incident angle of 0°, for example. Further, the optical filter preferably has a wavelength at which the transmittance in the spectral transmittance curve at an incident angle of 0° shifts to 5% or less between such a wavelength range where the average transmittance is 80% or more and the wavelength of 1100 nm, it is more preferably 3% or less, and still more preferably 1% or less. Also in this case, when the structure 1 includes two or more of the infrared reflection layers, the optical filter may be designed to have the above-described transmittance characteristics including these plural layers. The infrared reflection layer may be designed to include the above-described optical characteristics, thereby achieving the optical characteristics of the optical filter according to this embodiment. The optical filter including such an infrared reflection layer is applicable in conjunction with the structure containing various green coloring matters.

Further, in the dielectric multilayer film, preferably, the transmittance steeply changes in a boundary wavelength range of a shielded light wavelength with a transmitted light wavelength. The dielectric multilayer film for this purpose preferably has, as the total number of stacks of the low-refractive index film and the high-refractive index film, 15 layers or more, more preferably 25 layers or more, further preferably 30 layers or more. However, when the total number of layers becomes large, warping of the dielectric multilayer film, or the like occurs and the film thickness increases, and thus the dielectric multilayer film preferably has 100 layers or less, more preferably 75 layers or less, still more preferably 60 layers or less. The first layer may be either the low-refractive index film or the high-refractive index film as long as the low-refractive index film and the high-refractive index film are stacked alternately.

A film thickness of the dielectric multilayer film is preferred to be thin from the viewpoint of thinning of the optical filter after satisfying the above-described preferred number of stacks, and is preferably 2 to 10 μm, for example.

In forming the dielectric multilayer film, a vacuum film-forming process such as a CVD method, a sputtering method or a vacuum deposition method, or a wet film-forming process such as a spray method or a dip method can be used.

The optical filter according to this embodiment includes the structure containing the green coloring matter and the black coloring matter and the infrared reflection layer, thereby obtaining bandpass spectral characteristics. Since the type of the green coloring matter used for the optical filter according to this embodiment can be optionally selected from the above-described green coloring matters, it is possible to obtain an infrared transmitting wavelength range according to the design.

Concretely, when the squarylium-based coloring matter (coloring matter (A11-14)) is used as the green coloring matter, it is possible to include spectral transmittance characteristics in which the average transmittance of light in the wavelength range of 400 to 730 nm is 2% or less, the average transmittance of light in the wavelength range of 800 to 900 nm is 80% or more, the optical filter has a wavelength at which the transmittance shifts to 5% or less in the wavelength range of 900 to 1100 nm, and the transmittance on the long wavelength side relative to the wavelength of 900 nm is, for example, 1% or less. Further, it is possible to include spectral transmittance characteristics in which the transmittance of light in the wavelength range of 400 to 730 nm is 10% or less, or the transmittance of light in the wavelength range of 800 to 900 nm is 80% or more.

Such a bandpass filter can be expected to be applied as an optical filter that improves specific infrared transmitting sensitivity to be high in quality in such a manner to, for example, increase transmitting sensitivity of infrared light in the wavelength range of 800 to 900 nm and shield noise of light on the long wavelength side relative to 900 nm.

In the optical filter according to this embodiment, the dielectric multilayer film composing the infrared reflection layer may be designed to be a dielectric multilayer film that reflects light in a visible range (for example, 400 to 500 nm) close to an ultraviolet wavelength as well as the infrared light. Alternatively, the optical filter may be composed to include, in place of the infrared reflection layer, a reflection layer composed of a dielectric multilayer film that reflects visible light close to an ultraviolet wavelength. This composition makes it possible to reduce the number of coloring matters to be used when a mixed coloring matter is used as the black coloring matter. Further, a short wavelength with high energy is reflected, so that it is also possible to expect an effect of preventing coloring matter deterioration.

(Third Embodiment)

Figure 13:
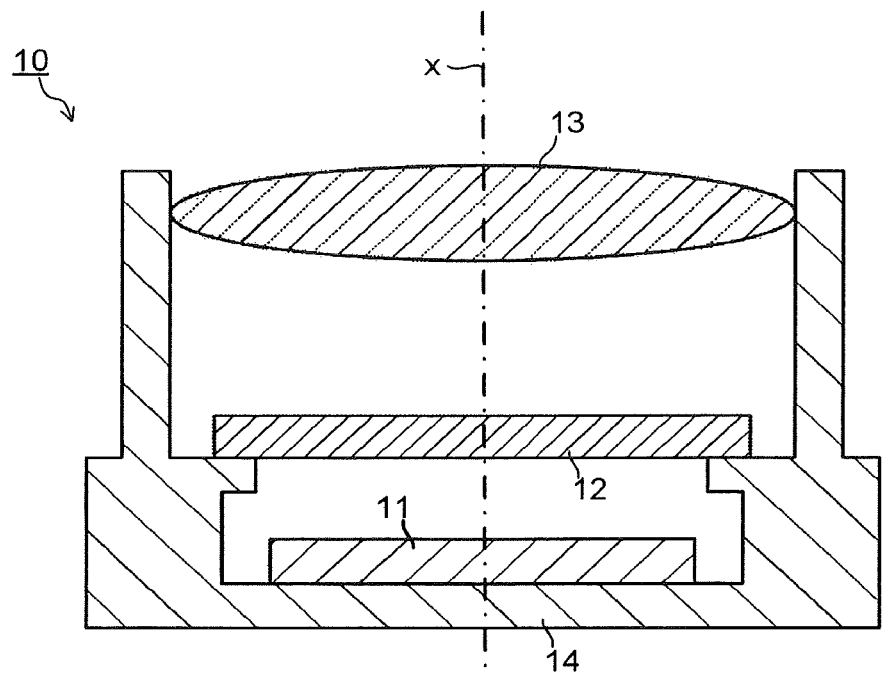
FIG. 13 is a cross-sectional view illustrating an imaging device according a third embodiment.

FIG. 13 is a cross-sectional view schematically illustrating an imaging device according to a third embodiment of the present invention.

An imaging device 10 according to this embodiment includes a solid-state image sensor 11, the optical filter 12 of the present invention, an imaging lens 13, and a casing 14 accommodating them. The solid-state image sensor 11 and the imaging lens 13 are arranged along an optical axis x. For the solid-state image sensor 11, a CCD, a CMOS or the like that converts light that has passed through the imaging lens 13 into an electric signal is used.

In the imaging device 10, light that has passed through the imaging lens 13 further passes through the optical filter 12 and is received on the solid-state image sensor 11, and this received light is converted by the solid-state image sensor 11 into an electric signal and is output as an imaging signal. The imaging device 10 includes, as the optical filter 12, an optical filter having an excellent infrared transmitting property that sufficiently shields visible light and sufficiently transmits required infrared light, and thus has high sensitivity to be able to obtain a high-quality taken image.

Further, the optical filter 12 does not have angle dependence in an absorption wavelength, and thus can sufficiently shield visible light even at a wide angle, so that an image becomes good in quality.

In the imaging device 10 illustrated in FIG. 13, the optical filter 12 is arranged between the imaging lens 13 and the solid-state image sensor 11, but its arrangement position is not limited in particular as long as the optical filter 12 is arranged in front of the solid-state image sensor 11. Further, in the imaging device 10, the imaging lens 13 is composed only of one lens, but may be a combination of a plurality of lenses.

Further, when the optical filter 12 includes the uppermost surface adhesive layer, the optical filter 12 can be arranged to directly adhere to other optical parts such as a cover glass with the uppermost surface adhesive layer interposed therebetween. The optical filter 12 is allowed to directly adhere to other optical parts, thereby making it possible to reduce the interface of the optical filter 12 coming into contact with air, resulting in that it is possible to improve light use efficiency of the whole imaging device.

EXAMPLES

Next, the present invention will be explained in more detail by using examples. Spectral transmittance curves of optical filters, infrared reflection layers, and the like in examples and a comparative example were measured using a spectrophotometer (manufactured by Hitachi, Ltd., model name U4100).

Example 1

4.488 g of a polyester resin (manufactured by Osaka Gas Chemicals Co., Ltd., product name "OKP850"), 0.473 g of an azo-based coloring matter (1) (C.I. solvent orange 7) as a black coloring matter, 0.591 g of an azo-based coloring matter (2) (C.I. solvent black 3) as a black coloring matter, 0.213 g of a squarylium-based coloring matter (coloring matter (A11-14)) as a green coloring matter, 0.394 g of a silane coupling agent (manufactured by Shin-Etsu Chemical Co., Ltd., product name "KBM403"), 0.039 g of an ultraviolet absorbent (manufactured by BASF Japan Ltd., product name "TINUVIN (registered trademark) 405"), and 0.016 g of a light stabilizer (manufactured by BASF Japan Ltd., product name "TINUVIN (registered trademark) 123") and an antioxidant (manufactured by ADEKA CORPORATION, product name "ADK STAB (registered trademark) A050") were dissolved in a mixed solvent of 8.5 g of cyclohexanone and 8.5 g of N-methyl-2-pyrrolidone to prepare a solution.

The solution was applied to one surface of a glass (manufactured by Matsunami Glass Ind., Ltd., product name "D263Teco") plate of 76 mm×76 mm×0.145 mm by using a spincoater (manufactured by Mikasa Co., Ltd., spincoater MS-A200) to be heated for one hour at 150° C. to form a 3.5 µm thick structure, and then an optical filter was obtained.

Example 2

On one surface of a glass (D263Teco) plate of 76 mm×76 mm×0.145 mm, a 340 nm thick anti-reflection film (seven layers) was formed by alternately stacking an $SiO_2$ layer and a $TiO_2$ layer by a vacuum deposition method.

Next, on the other surface of the glass plate on which this anti-reflection film was formed, a 3.5 µm thick structure was formed in the same manner as in Example 1, and then an optical filter was obtained.

Example 3

In the same manner as in Example 1, on one surface of the same glass plate as that in Example 2, a 3.5 µm thick structure was formed, and then on a surface of the structure, a 340 nm thick anti-reflection film (seven layers) having a passivation function in combination was formed by alternately stacking an $SiO_2$ layer and a $TiO_2$ layer by a vacuum deposition method, and then an optical filter was obtained.

Example 4

In the same manner as in Example 1, on one surface of the same glass plate as that in Example 2, a 3.5 µm thick structure was formed, and then an ultraviolet curable acrylic resin composition prepared by mixing 6 parts by mass of dicyclopentanyl acrylate, 4 parts by mass of tricylodecane dimethanol diacrylate, and 0.5 parts by mass of an photo-polymerization initiator (1-hydroxy-cyclohexylphenylke-tone) was dropped onto a surface of the structure, and on the resultant surface of the structure, a release-treated glass substrate was overlaid. This coating layer was irradiated with ultraviolet light with an illuminance of 100 mW/cm², to thereby cure the coating layer, and subsequently the glass was released and a 2 µm thick protective layer was formed, and then an optical filter was obtained.

Example 5

By using a solution prepared in the same manner as in Example 1 except that as the green coloring matter, in place of the squarylium-based coloring matter, 0.66 g of a phtha-locyanine-based coloring matter (manufactured by YAMADA CHEMICAL CO., LTD., product name "FDN-001") was added, a 4.0 µm thick structure was formed in the same manner as in Example 1 on one surface of the same glass plate as that in Example 2, and then an optical filter was obtained.

Example 6

Figure 14:
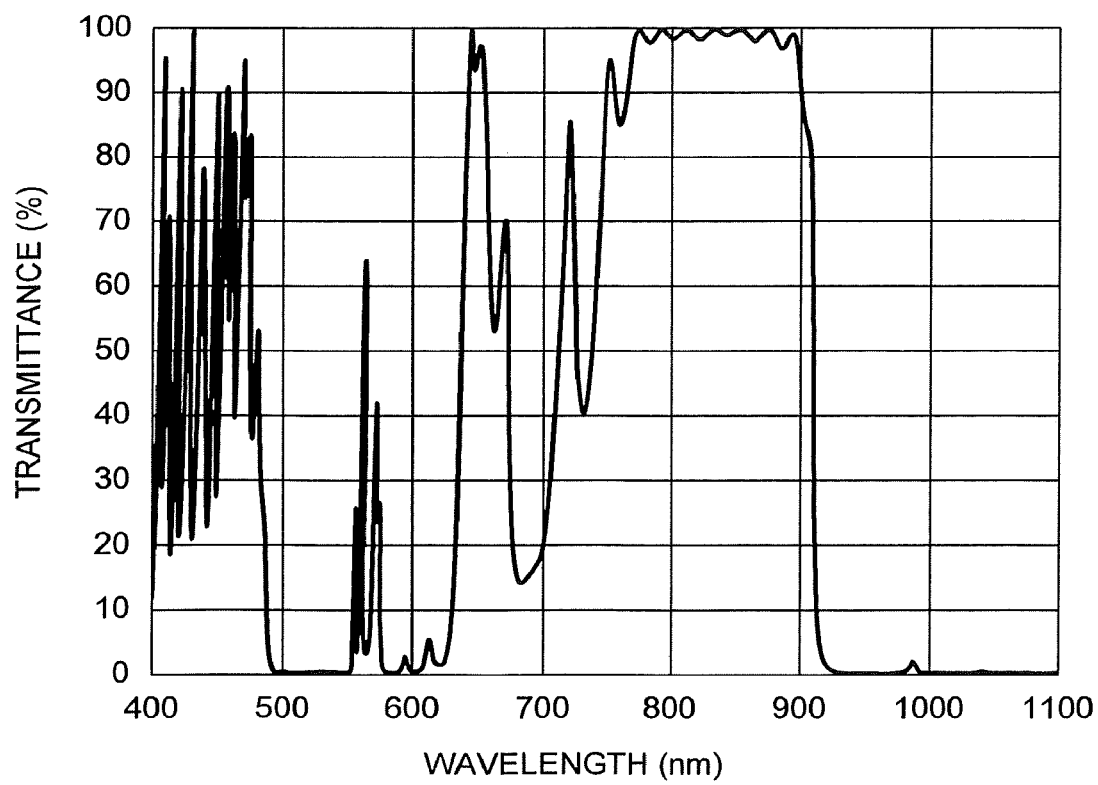
FIG. 14 is a view illustrating a spectral transmittance curve of an infrared reflection layer in one example.

On one surface of the same glass plate as that in Example 2, an infrared reflection layer composed of a dielectric multilayer film having a thickness of about 6 µm was formed by alternately stacking an $SiO_2$ layer and a $TiO_2$ layer by a vacuum deposition method. FIG. 14 illustrates a spectral transmittance curve (light incident angle of 0°) obtained by performing a simulation of a glass plate on which a light reflection film was formed.

Next, on the other surface of the glass plate on which the above-described infrared reflection layer was formed, a 3.5 µm thick structure was formed in the same manner as in Example 1, and then an optical filter was obtained.

Example 7

Figure 15:
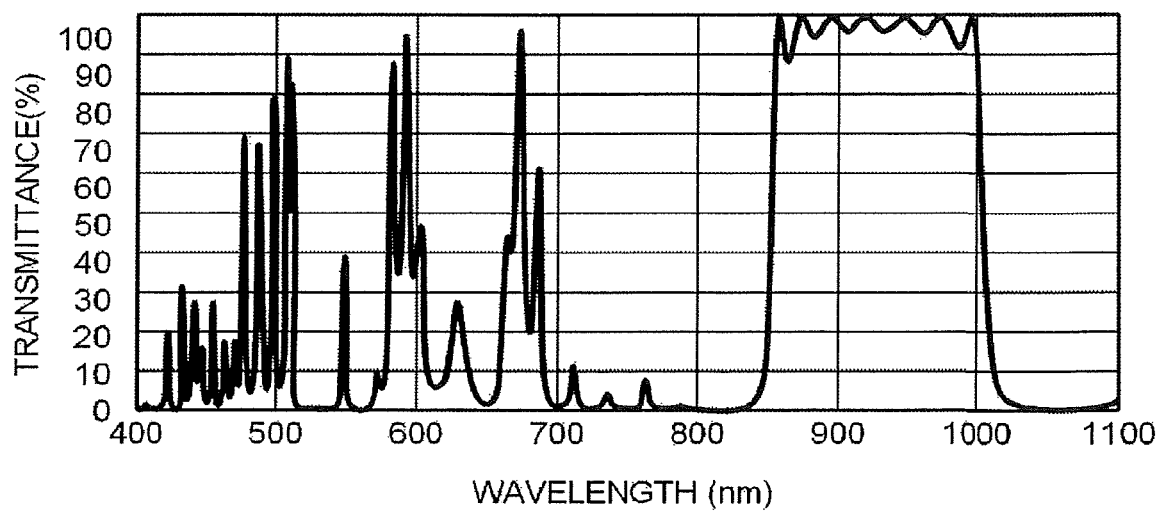
FIG. 15 is a view illustrating a spectral transmittance curve of an infrared reflection layer in one example.

On one surface of the same glass plate as that in Example 1, an infrared reflection layer composed of a dielectric multilayer film having a thickness of about 7 µm was formed by alternately stacking an $SiO_2$ layer and a $TiO_2$ layer by a vacuum deposition method. FIG. 15 illustrates a spectral transmittance curve (light incident angle of 0°) obtained by performing a simulation of the infrared reflection layer attached glass plate.

Next, on the other surface of the above-described infrared reflection layer attached glass plate, a 4.0 µm thick structure was formed in the same manner as in Example 5, and then an optical filter was obtained.

Comparative Example

By using a solution prepared in the same manner as in Example 1 except that the squarylium-based coloring matter (coloring matter (A11-14)) was not mixed, a 3.5 µm thick structure was formed in the same manner as in Example 1 on one surface of the same glass plate as that in Example 2, and then an optical filter was obtained.

Example 8

By using a solution prepared in the same manner as in Example 1 except that as the green coloring matter, in place of the squarylium-based coloring matter, 0.66 g of a phtha-locyanine-based coloring matter (manufactured by YAMADA CHEMICAL CO., LTD., product name "FDR-005") was added, an optical filter including the structure and the glass plate used in Example 1 was obtained.

Example 9

By using a solution prepared in the same manner as in Example 1 except that as the green coloring matter, in place of the squarylium-based coloring matter, 0.66 g of a cya-nine-based coloring matter (manufactured by FEW Chemicals GmbH, product name "S0830") was added, an optical filter including the structure and the glass plate used in Example 1 was obtained.

Example 10

By using a solution prepared in the same manner as in Example 1 except that in place of the polyester resin, a polyimide resin (manufactured by MITSUBISHI GAS CHEMICAL COMPANY, INC., product name "C3450") was used, an optical filter including the structure and the glass plate used in Example 1 was obtained.

Example 11

By using a solution prepared in the same manner as in Example 1 except that in place of the polyester resin, an acrylic resin (manufactured by Daicel-Evonik Ltd., product name "TT50") was used, an optical filter including the structure and the glass plate used in Example 1 was obtained.

Example 12

A solution was prepared by dissolving 4.488 g of a polyester resin (OKP805), 0.473 g of an azo-based coloring matter (1) (C.I. solvent orange 7) as a black coloring matter, 0.591 g of an azo-based coloring matter (2) (C.I. solvent black 3) as a black coloring matter, 0.213 g of a squarylium-based coloring matter (coloring matter (A11-14)) as a green coloring matter, 0.394 g of a silane coupling agent (KBM403), 0.039 g of an ultraviolet absorbent (TINUVIN (registered trademark) 405), and 0.016 g of a light stabilizer (TINUVIN (registered trademark) 123) and an antioxidant (ADK STAB (registered trademark) A050) in a mixed solvent of 8.5 g of cyclopentanone and 8.5 g of methyl ethyl ketone.

The solution was applied to one surface of a corona-treated polyimide roll film (manufactured by MITSUBISHI GAS CHEMICAL COMPANY, INC., product name "Neopulim (registered trademark) L-3450"; thickness 50 µm) having a 250 mm width by using a die coater and heated and dried to form a 3.5 µm thick structure, and then an optical filter was obtained.

Example 13

An optical filter was obtained in the same manner as in Example 11 except that in place of the polyimide roll film, a cycloolefin-based copolymer film (manufactured by GUNZE LIMITED, product name "F1-EX") was used as the infrared transmitting substrate.

Example 14

A corona treatment was performed on a structure-side outer surface of the optical filter obtained in Example 12, and then to the corona-treated surface, there was applied a composition composed of 60 parts by mass of acryloylmorpholine (manufactured by KJ Chemicals Corporation, product name "ACMO (registered trademark)"), 40 parts by mass of dipentaerythritol hexaacrylate (manufactured by Nippon Kayaku Co., Ltd., product name "KAYARAD (registered trademark)-DPHA"), and 5 parts by mass of a photopolymerization initiator 2-methyl-1-[4-(methylthio) phenyl]-2-morpholino propane-1-on (manufactured by BASF Japan Ltd., product name "Irgacure (registered trademark) 907") by a die coater, and then this coating layer was irradiated with ultraviolet light with an illuminance of 200 mW/cm$^2$, to thereby cure the coating layer, and a 3 µm thick protective layer was formed, and then an optical filter was obtained.

Example 15

The same anti-reflection film as that in Example 2 was formed on an infrared transmitting substrate-side outer surface of the optical filter obtained in Example 14 to obtain an optical filter.

Example 16

This example is an example of an optical filter using a cover glass as the infrared transmitting substrate. First, as a peelable substrate, a roll film (manufactured by Zeon Corporation, product name "ZEONOR (registered trademark) ZF16"; thickness 100 µm) was prepared, and to one surface of the substrate, a coating liquid prepared in the same manner as in Example 5 was applied by a die coater to be heated and dried, and then a 3.5 µm thick structure was obtained. Next, on a surface of the structure, a 3 µm thick protective layer was formed with the same materials as those in Example 14 and by the same method as that in Example 14. Next, on the protective layer, a slightly adhesive film (manufactured by NICHIEI KAKOH CO., LTD., product name "PET75-11109(20)" was applied to peel off the above-described peelable substrate. Next, on a surface of the structure of the side where the peelable substrate had been provided, an OCA tape (manufactured by 3M Japan Limited, product name "3M (trademark) OCA tape 8171CL"; thickness 25 µm) was applied. Thereafter, on a cover glass composed of tempered glass (manufactured by ASAHI GLASS CO., LTD., product name "Dragontrail (registered trademark)"; thickness 0.5 mm), the above-described OCA tape was applied to peel off the above-described slightly adhesive film, and then an optical filter was obtained. The total of thicknesses of the structure, the protective film, and the OCA tape was 31.5 µm.

Example 17

Figure 16:
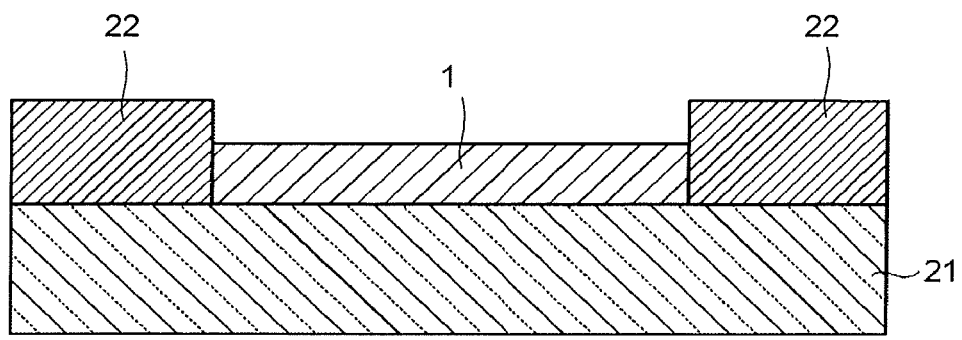
FIG. 16 is a cross-sectional view illustrating an optical filter in one example.

This example is an example of an optical filter including a structure on a cover glass whose peripheral portion was decoratively printed. First, a cover glass having a 2.5 mm diameter circular opening portion and having a black frame containing carbon black as a black pigment printed on a periphery around the opening portion was prepared, and the opening portion was surface treated with 3-aminopropyltriethoxysilane. Next, a coating liquid prepared in the same manner as in Example 5 was applied to the surface-treated opening portion by cast coating and heated and dried to form a 6.5 µm thick structure, and then an optical filter was obtained. FIG. 16 illustrates the optical filter obtained in this example. In FIG. 16, 1 denotes the structure, 21 denotes the cover glass, and 22 denotes the black frame. The carbon black contained in the black frame 22 does not transmit light in the wavelength range of 800 to 1000 nm and the structure 21 transmits the light in the same wavelength range, and therefore, it is possible to provide, on the cover glass 21, a specific region that transmits light in the wavelength range of 800 to 1000 nm.

Figure 17:
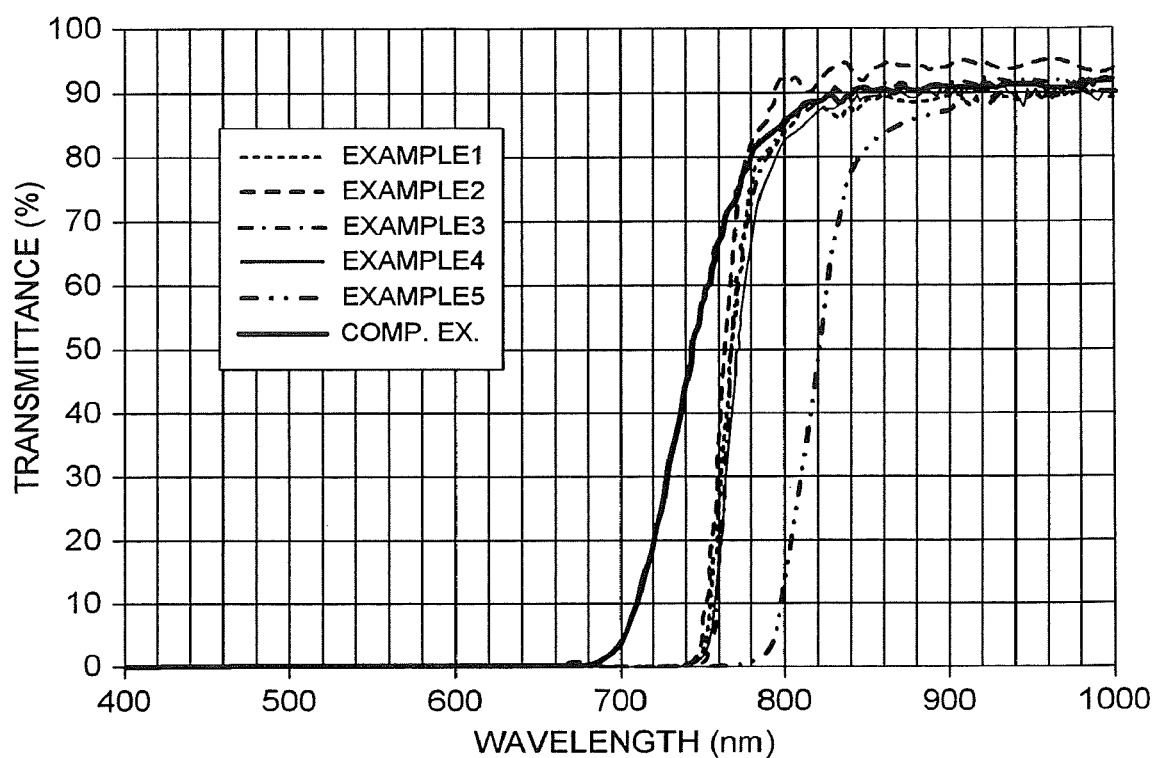
FIG. 17 is a view illustrating spectral transmittance curves of optical filters in examples and a comparative example.

Spectral transmittance curves of the optical filters obtained in the respective examples and the comparative example were obtained. Results are illustrated in FIG. 17 (Examples 1 to 5, Comparative example), FIG. 18 (Example 6), FIG. 19 (Example 7), FIG. 20 (Examples 8 to 11), FIG. 21 (Examples 12 to 15), and FIG. 22 (Examples 16, 17). In Example 15, the spectral transmittance curves at incident angles of 0° and 40° were obtained, and in each of the other examples, the spectral transmittance curve at an incident angle of 0° was obtained.

As is clear from FIG. 17, in Examples 1 to 4 where the azo-based coloring matter and the squarylium-based coloring matter were used, the transmittance of light in the wavelength range of 400 to 730 nm was almost 0%, the average transmittance of light in the wavelength range of 800 to 900 nm was 80% or more, and the transmittance steeply changed in the wavelength range of 730 to 800 nm (in Example 1, a displacement amount D of the transmittance in a wavelength range (756 to 787 nm) where the transmittance shifts to 80% from 10% was 2.25%/nm).

In contrast to this, in Comparative example where the squarylium-based coloring matter was not used, the transmittance of light in a wavelength range up to about 670 nm was about 0%, the transmittance of light in a wavelength range of about 850 nm or more was about 90% or more, and the transmittance gently changed between these (about 670 to about 850 nm) (in Comparative example, the displacement amount D of the transmittance in a wavelength range (710 to 779 nm) where the transmittance shifts to 80% from 10% was 1.02%/nm). The above indicates that the squarylium-based coloring matter is preferably used in order to steeply change the transmittance in the wavelength range of 730 to 800 nm.

Further, in Example 5 where the azo-based coloring matter and the phthalocyanine-based coloring matter were used, the transmittance of light in the wavelength range of 400 to 760 nm was almost 0%, the average transmittance of light in the wavelength range of 800 to 1000 nm was 80% or more, and the transmittance steeply changed in the wavelength range of 760 to 860 nm (in Example 6, the displacement amount D of the transmittance in a wavelength range (798 to 842 nm) where the transmittance shifts to 80% from 10% was 1.58%/nm). The above indicates that the phthalocyanine-based coloring matter is preferably used in order to steeply change the transmittance in the wavelength range of 760 to 860 nm.

Figure 18:
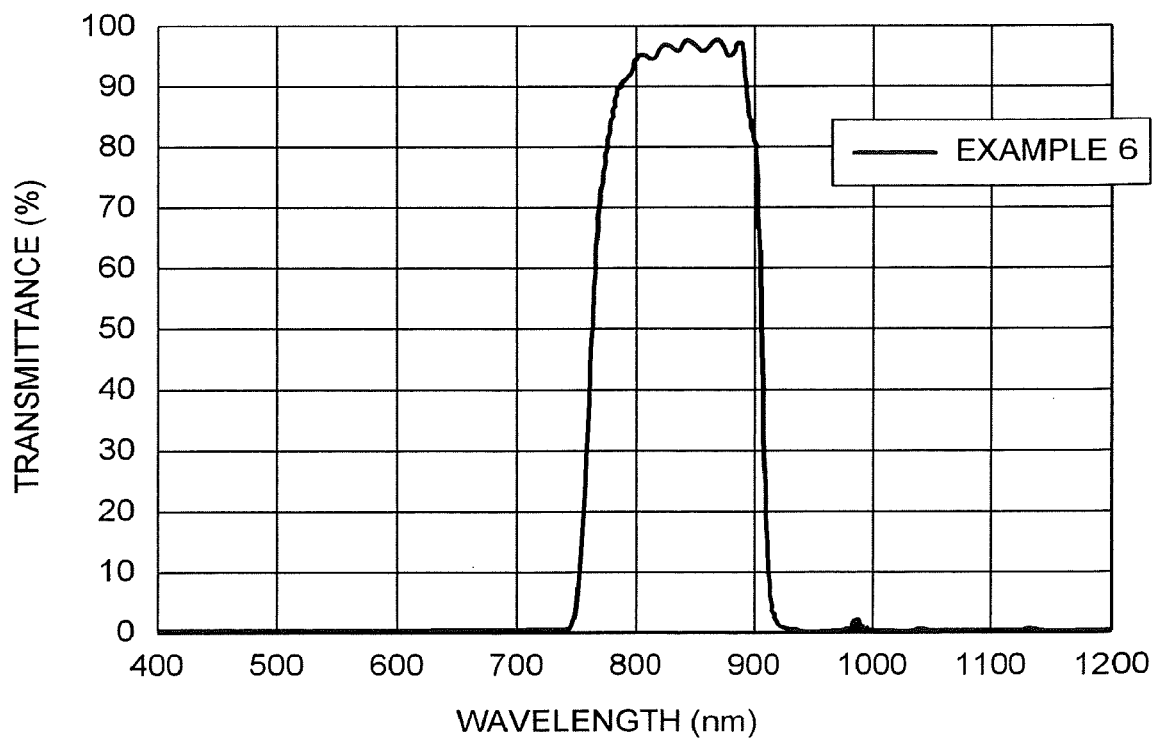
FIG. 18 is a view illustrating a spectral transmittance curve of an optical filter in one example.

Further, FIG. 18 reveals that in Example 6 where the infrared reflection layer composed of the dielectric multilayer film was provided together with the azo-based coloring matter and the squarylium-based coloring matter, the transmittance of light in the wavelength range of 400 to 730 nm was almost 0%, the average transmittance of light in the wavelength range of 800 to 900 nm was 80% or more, the transmittance of light in the wavelength range of 800 to 900 nm was 80% or more, and the transmittance steeply changed in the wavelength range of 730 to 800 nm, and additionally, the transmittance steeply dropped in the wavelength range of 900 to 950 nm, and the transmittance of light in the wavelength range of 950 nm or more was almost 0% resulting in that Example 6 was useful as a bandpass filter that has high transmitting sensitivity for infrared light in the wavelength range of 800 to 900 nm and shields noise of infrared light on the long wavelength side relative to 900 nm.

Figure 19:
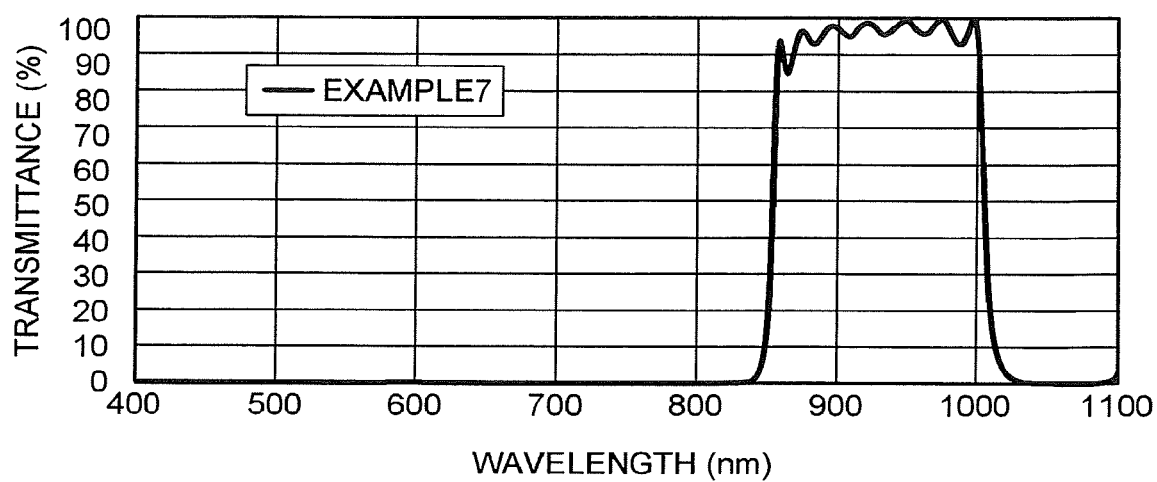
FIG. 19 is a view illustrating a spectral transmittance curve of an optical filter in one example.

FIG. 19 reveals that in Example 7 where the infrared reflection layer composed of the dielectric multilayer film was provided together with the azo-based coloring matter and the phthalocyanine-based coloring matter, the transmittance of light in the wavelength range of 400 to 730 nm was almost 0%, the average transmittance of light in the wavelength range of 900 to 1000 nm was 80% or more, the transmittance of light in the wavelength range of 900 to 1000 nm was 80% or more, and the transmittance steeply changed in the wavelength range of 800 to 860 nm, and additionally, the transmittance steeply dropped in the wavelength range of 1000 to 1050 nm, and the transmittance of light in the wavelength range of 1050 nm or more was almost 0%, resulting in that Example 7 was useful as a bandpass filter that has high transmitting sensitivity for infrared light in the wavelength range of 900 to 1000 nm and shields noise of infrared light on the long wavelength side relative to 1000 nm.

Figure 20:
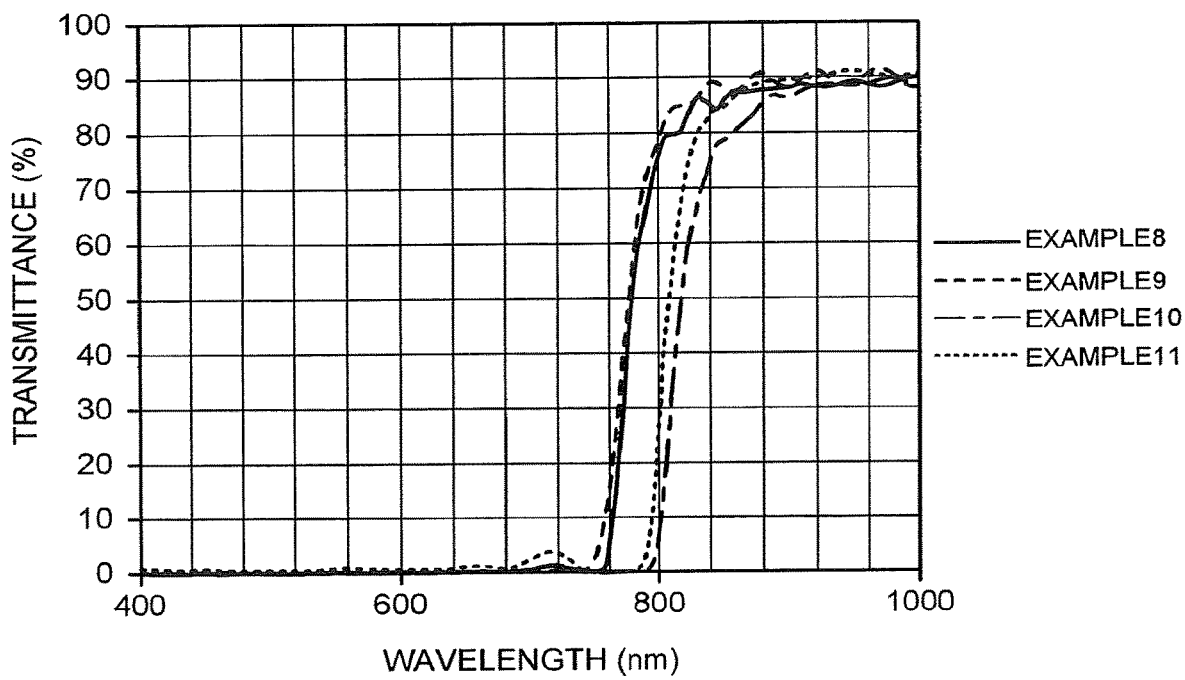
FIG. 20 is a view illustrating spectral transmittance curves of optical filters in examples.

FIG. 20 reveals that even when the phthalocyanine-based coloring matter and the cyanine-based coloring matter were used in combination for the azo-based coloring matter, and further even when the acrylic resin and the polyimide resin were used for the transparent resin, the average transmittance of light in the wavelength range of 400 to 730 nm was almost 0% and the optical filter had a continuous 50 nm wavelength range where the average transmittance is 80% or more in the wavelength range of 800 to 1000 nm. Incidentally, in Examples 8 to 11, the displacement amount D of the transmittance of light in a wavelength range where the transmittance shifts to 80% from 10% was 1.32%/nm, 1.53%/nm, 1.25%/nm, and 1.89%/nm respectively.

Figure 21:
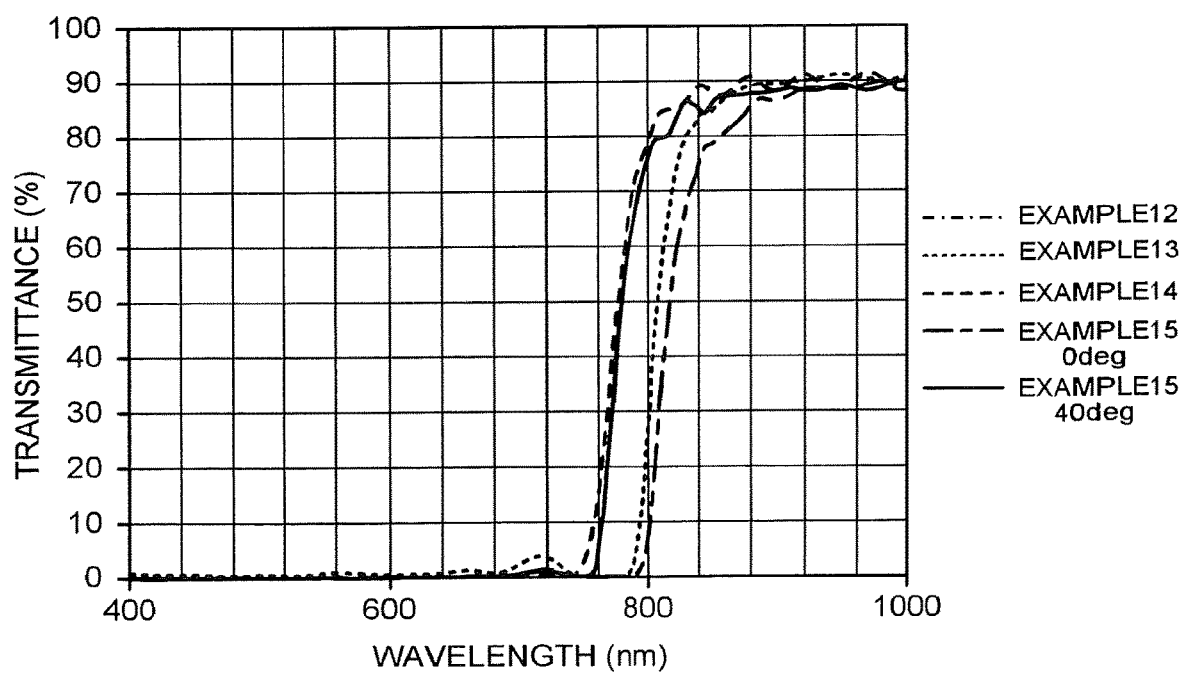
FIG. 21 is a view illustrating spectral transmittance curves of optical filters in examples.

FIG. 21 reveals that even when the resin film was used as the infrared transmitting substrate, the average transmittance of light in the wavelength range of 400 to 730 nm was almost 0% and the optical filter had a continuous 50 nm wavelength range where the average transmittance is 80% or more in the wavelength range of 800 to 1000 nm.

Figure 22:
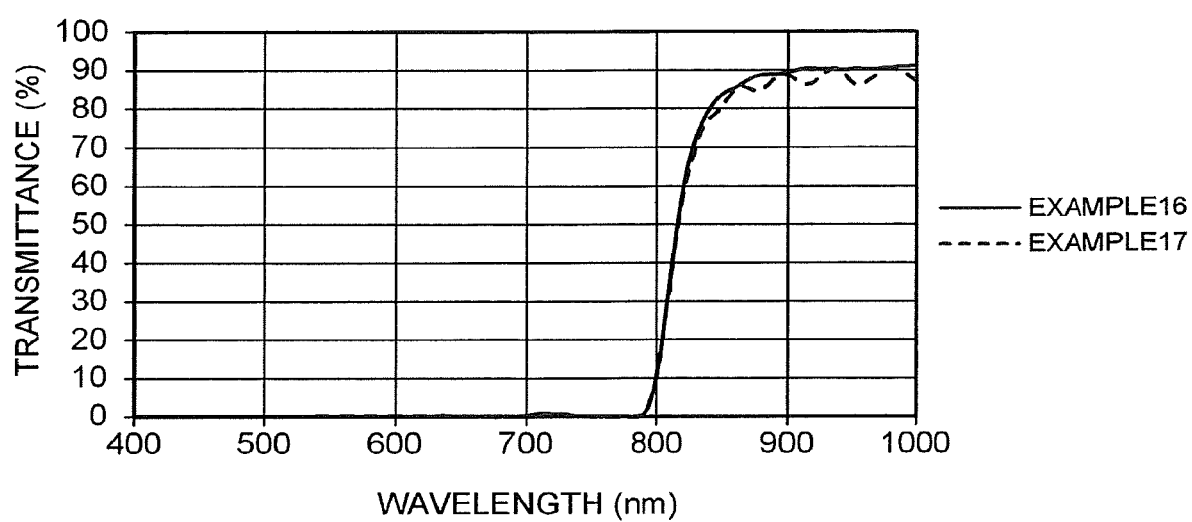
FIG. 22 is a view illustrating spectral transmittance curves of optical filters in examples.

FIG. 22 reveals that even when the structure was transferred onto the infrared transmitting substrate or another part, (where a cover glass was used), from the peelable substrate, and even when the structure was formed in the opening portion of the cover glass, the average transmittance of light in the wavelength range of 400 to 730 nm was almost 0% and the optical filter had a continuous 50 nm wavelength range where the average transmittance is 80% or more in the wavelength range of 800 to 1000 nm.

Among them, particularly, the optical filter in Example 15 is low in angle dependence of the spectral transmittance curve, and is suitable for usage affected by the angle dependence (for an infrared camera, and the like, for example).

Incidentally, in Examples 12 to 14, Example 15 (0°), and Example 15 (40°), the displacement amount D of the transmittance in a wavelength range where the transmittance shifts to 80% from 10% was 1.69%/nm, 1.87%/nm, 1.80%/nm, 1.96%/nm, and 1.91%/nm respectively.

Next, the structure-side surface of each of the optical filters obtained in Examples 3, 4, 13, 14, and 15 was rubbed back and forth 25 times with a 500 g weight covered with a wiper manufactured by OZU CORPORATION (product name "BEMCOT (registered trademark) (EA-8)") to then observe the presence or absence of a flaw by a microscope, and then flaws were not observed at all.

Further, each of the optical filters obtained in Examples 3, 4, 13, 14, and 15 was subjected to a weather resistance test (80-hour exposure) specified in IEC60068-2-5, and then the transmittance change in 850 nm before and after exposure was within 5% in all samples.

The optical filter of the present invention has an excellent infrared selective transmitting property that is excellent in visible light shielding property and infrared transmitting property and in which a transmittance changes steeply in a range from a visible wavelength range to an infrared wavelength range, and thus can be suitably utilized as an optical filter for an infrared camera, an optical system in which an infrared sensor is housed, an infrared sensor, an infrared communication device, an infrared remote control device, and the like.

What is claimed is:
1. An optical filter, comprising:
 a structure that contains a green coloring matter and a black coloring matter and satisfies the following requirements (i) and (ii):
 (i) an average transmittance of light in the wavelength range of 400 to 730 nm is 2% or less, and
 (ii) a continuous 50 nm wavelength range where an average transmittance is 80% or more exists in the wavelength range of 800 to 1000 nm,
 wherein the green coloring matter comprises at least one selected from phthalocyanine-based coloring matters of formula (B1) or (B2),
 the structure has a thickness of 0.1 to 100 μm and an average transmittance of light in the wavelength range of 860 to 1000 nm being 80%or more, and
 the structure has a transition wavelength range where the transmittance shifts to 80% from 10% in the wave- length range of 760 to 860 nm, and a variation of the transmittance in the transition wavelength range is 0.75%/nm or more:

(B1)

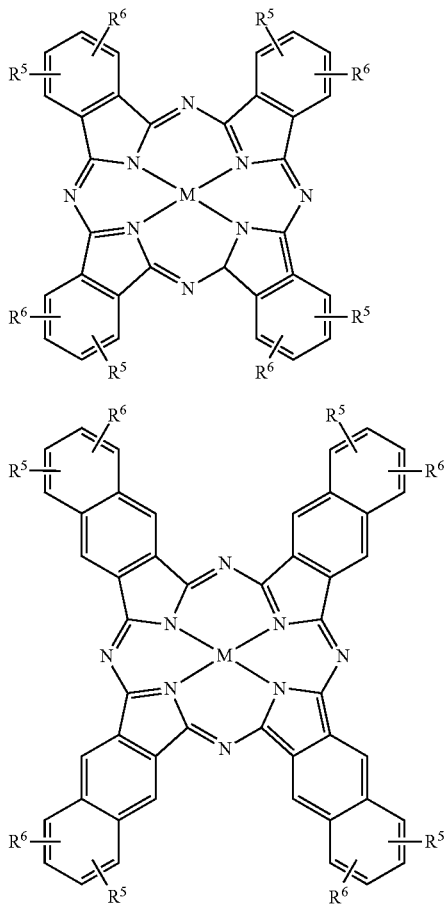

(B2)

wherein
M is two hydrogen atoms, two monovalent metal atoms, or a substituted metal atom having a trivalent or quadrivalent metal atom;
$R^5$ and $R^6$ are each independently an optionally substituted $C_1$-$C_{25}$ hydrocarbon group where one or more hydrogen atoms in the $C_1$-$C_{25}$ hydrocarbon may be substituted with a hydroxyl group, a carboxyl group, fluorine, a cyano group, an unsaturated bond, oxygen, a saturated or unsaturated ring structure may be contained between carbon atoms, or a group of Formula (B-a), Formula (B-b), or Formula (B-c):

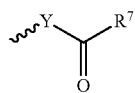

(B-a)

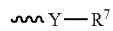

(B-b)

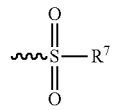

(B-c)

wherein Y is oxygen or sulfur, and $R^7$ is an optionally substituted $C_1$-$C_{25}$ hydrocarbon where one or more hydrogen atoms in the $C_1$-$C_{25}$ hydrocarbon may be substituted with a hydroxyl group, a carboxyl group, fluorine, or a cyano group, an unsaturated bond, oxygen, or a saturated or unsaturated ring structure may be contained between carbon atoms.

2. The optical filter according to claim 1, wherein the structure has a transmittance of light in the wavelength range of 400 to 730 nm being 10% or less.

3. The optical filter according to claim 1, wherein the structure contains a transparent resin, and in the transparent resin, the green coloring matter and the black coloring matter are dispersed or dissolved.

4. The optical filter according to claim 1, wherein the structure has a transmittance in the wavelength of 860 to 1000 nm being 80% or more.

5. The optical filter according to claim 1, wherein the black coloring matter comprises an azo-based dye.

6. The optical filter according to claim 1, further comprising an infrared transmitting substrate on one side or both sides of the structure.

7. The optical filter according to claim 6, wherein the infrared transmitting substrate comprises a cover glass having an opening portion.

8. The optical filter according to claim 1, further comprising an infrared reflection layer on one side or both sides of the structure, the infrared reflection layer having, in a spectral transmittance curve at an incident angle of 0°, an average transmittance of light in the wavelength range of 900 to 1000 nm being 80% or more, and has a wavelength at which a transmittance is 5% or less in the wavelength range of 1000 to 1100 nm.

9. The optical filter according to claim 1, further comprising a protective layer on one side or both sides of the structure.

10. The optical filter according to claim 9, wherein the protective layer is composed of an inorganic film.

11. The optical filter according to claim 9, wherein the protective layer is composed of an organic film.

12. The optical filter according to claim 1, further comprising an adhesive layer exhibiting an infrared transmitting property on an uppermost surface that comes into contact with the outside air.

13. The optical filter according to claim 1, wherein a total thickness of the optical filter is 50 μm or less.

14. A device, comprising:
the optical filter according to claim 1.

* * * * *